US006779892B2

(12) United States Patent
Agostinelli et al.

(10) Patent No.: US 6,779,892 B2
(45) Date of Patent: Aug. 24, 2004

(54) MONOCENTRIC AUTOSTEREOSCOPIC OPTICAL DISPLAY HAVING AN EXPANDED COLOR GAMUT

(75) Inventors: John A. Agostinelli, Rochester, NY (US); Marek W. Kowarz, Henrietta, NY (US); Louis S. Horvath, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/205,723

(22) Filed: Jul. 26, 2002

(65) Prior Publication Data

US 2004/0017546 A1 Jan. 29, 2004

(51) Int. Cl.$^7$ .............................................. G03B 21/00
(52) U.S. Cl. ............................................ 353/7; 353/31
(58) Field of Search .............................. 353/7, 8, 30–34, 353/81, 94, 85, 122; 359/462, 475, 477; 349/5, 7–10

(56) References Cited

U.S. PATENT DOCUMENTS

| 3,748,015 A | 7/1973 | Offner |
| 4,124,798 A | 11/1978 | Thompson |
| 4,331,390 A | 5/1982 | Shafer |
| 4,623,223 A | 11/1986 | Kempf |
| 4,781,435 A | 11/1988 | Lippmann et al. |
| 4,799,763 A | 1/1989 | Davis et al. |
| 4,854,688 A | 8/1989 | Hayford et al. |

(List continued on next page.)

FOREIGN PATENT DOCUMENTS

WO 01/95544 12/2001

OTHER PUBLICATIONS

G. J. Kintz; Autostereoscopic Properties of Spherical Panoramic Virtual Displays; SID 99 Digest, pp. 1000–1003.
H. Weiss; Display Systems Engineering; 1968, pp. 205–209.
S. Benton, T. Slowe, A. Kropp, and S. Smith; Micropolairzer–Based Multiple–Viewer Autosteroscopic Display; *Stereoscopic Displays and Virtual Reality Systems VI (SPIE,* Jan. 1999), pp. 1–8.
S. McKay, G. Mair, S. Mason, and K. Revie; Membrane Mirror Based Autostereoscopic Display for Tele–Operation and Telepresence Applications; Stereoscopic Displays and Virtual Reality Systems VII, SPIE vol. 3957 (2000), pp. 198–207.

(List continued on next page.)

*Primary Examiner*—Russell Adams
*Assistant Examiner*—Andrew Sever
(74) *Attorney, Agent, or Firm*—Nelson Adrian Blish

(57) ABSTRACT

A substantially monocentric arrangement of optical components providing a multicolor stereoscopic display having an expanded color gamut. A virtual image is electronically generated by an image generation system (70) having four or more color light sources (20) and is projected, as a real intermediate image, near the focal surface (22) of a curved mirror (24) by means of a scanning ball lens assembly (100). To form each left and right intermediate image component, a separate image generation system (70) comprises a scanning ball lens assembly (100) that uses a spherical lens (46) for wide field of view and a reflective surface (102). A monocentric arrangement of optical components images the left and right scanning ball lens pupil at the corresponding left and right viewing pupil (14) of the observer (12) and essentially provides a single center of curvature for projection components. Use of such a monocentric arrangement with electromechanical grating light modulator (85) as a linear image source and scanning ball lens assemblies (100) provides an exceptionally wide field of view with large viewing pupil (14). The use of four or more light sources (20) provides an expanded color gamut.

113 Claims, 18 Drawing Sheets

U.S. PATENT DOCUMENTS

| | | |
|---|---|---|
| 5,206,499 A | 4/1993 | Mantravadi et al. |
| 5,255,028 A | 10/1993 | Biles |
| 5,311,360 A | 5/1994 | Bloom et al. |
| 5,319,968 A | 6/1994 | Billing-Ross et al. |
| 5,572,229 A | 11/1996 | Fisher |
| 5,671,992 A | 9/1997 | Richards |
| 5,908,300 A | 6/1999 | Walker et al. |
| 5,936,774 A | 8/1999 | Street |
| 5,940,564 A | 8/1999 | Jewell |
| 6,034,717 A | 3/2000 | Dentinger et al. |
| 6,191,826 B1 | 2/2001 | Murakami et al. |
| 6,220,710 B1 | 4/2001 | Raj et al. |
| 6,233,100 B1 | 5/2001 | Chen et al. |
| 6,256,073 B1 | 7/2001 | Pettitt |
| 6,307,663 B1 | 10/2001 | Kowarz |
| 6,416,181 B1 * | 7/2002 | Kessler et al. ............... 353/7 |
| 6,511,182 B1 * | 1/2003 | Agostinelli et al. ........... 353/7 |
| 6,522,474 B2 * | 2/2003 | Cobb et al. ............... 359/633 |
| 6,550,918 B1 * | 4/2003 | Agostinelli et al. ........... 353/7 |

OTHER PUBLICATIONS

W. Smith; Modern Optical Engineering; pp. 42–45.

E. Seibel, Q. Smithwick C. Brown, and P. Reinhall; Single Fiber Flexible Endoscope: General Design for Small Size, High Resolution, and Wide Field of View; Proceedings of SPIE vol. 4158 (2001), pp. 29–39.

* cited by examiner

MONOCENTRIC AUTOSTEREOSCOPIC OPTICAL DISPLAY HAVING AN EXPANDED COLOR GAMUT

CROSS REFERENCE TO RELATED APPLICATIONS

Reference is made to commonly-assigned copending U.S. patent application Ser. No. 09/854,699, filed May 14, 2001, entitled ADAPTIVE AUTOSTEREOSCOPIC DISPLAY SYSTEM, by Covannon et al.; U.S. patent application Ser. No. 10/010,500, filed Nov. 13, 2001, entitled AN AUTOSTEREOSCOPIC OPTICAL APPARATUS USING A SCANNED LINEAR IMAGE SOURCE, by Agostinelli et al.; U.S. patent application Ser. No. 10/095,341, filed Mar. 8, 2002, entitled A MONOCENTRIC AUTOSTEREOSCOPIC OPTICAL APPARATUS USING RESONANT FIBER-OPTIC IMAGE GENERATION, by Agostinelli et al.; U.S. patent application Ser. No. 10/101,291, filed Mar. 19, 2002, entitled A MONOCENTRIC AUTOSTEREOSCOPIC VIEWING APPARATUS USING RESONANT FIBER-OPTIC IMAGE GENERATION, by Agostinelli et al.; and U.S. patent application Ser. No. 10/137,676, filed May 2, 2002, entitled A MONOCENTRIC AUTOSTEREOSCOPIC OPTICAL APPARATUS USING A SCANNED LINEAR ELECTROMECHANICAL MODULATOR, by Agostinelli et al., the disclosures of which are incorporated herein.

FIELD OF THE INVENTION

This invention generally relates to autostereoscopic display systems for viewing electronically generated images and more particularly relates to an apparatus and method for generating left- and right-eye images having a broadened color gamut using a monocentric arrangement of optical components to provide a very wide field of view and large exit pupils.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a three-dimensional image having a very wide field of view. As differentiated from the larger group of stereoscopic displays that include it, the autostereoscopic display is characterized by the absence of any requirement for a wearable item of any type, such as goggles, headgear, or special glasses, for example. That is, an autostereoscopic display attempts to provide "natural" viewing conditions for an observer.

In an article in *SID 99 Digest*, "Autostereoscopic Properties of Spherical Panoramic Virtual Displays", G. J. Kintz discloses one approach to providing autostereoscopic display with a wide field of view. Using the Kintz approach, no glasses or headgear are required. However, the observer's head must be positioned within a rapidly rotating spherical shell having arrays of LED emitters, imaged by a monocentric mirror, to form a collimated virtual image. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement.

One class of autostereoscopic systems that operates by imaging the exit pupils of a pair of projectors onto the eyes of an observer, that is, by forming right- and left-viewing pupils, is as outlined in an article by S. A. Benton, T. E. Slowe, A. B. Kropp, and S. L. Smith ("Micropolarizer-Based Multiple-Viewer Autostereoscopic Display", in *Stereoscopic Displays and Virtual Reality Systems VI, SPIE*, January, 1999). An earlier reference to pupil imaging is made by Helmut Weiss in *Display Systems Engineering*, McGraw-Hill, New York, 1968, pp. 205–209. Pupil imaging, as outlined by Benton in the above-mentioned article and by Helmut Weiss, can be implemented using large lenses or mirrors. An observer whose eyes are coincident with the imaged pupils can view a stereoscopic scene without crosstalk, without wearing eyewear of any kind. Another early reference to pupil imaging can be found in U.S. Pat. No. 4,781,435 (Lippmann et al.), which is directed to stereoscopic presentation of a moving image.

It can be readily appreciated that the value and realistic quality of the viewing experience provided by an autostereoscopic display system using pupil imaging is enhanced by presenting the three-dimensional image with a wide field of view and large exit pupil. Such a system is most effective for immersive viewing functions if it allows an observer to be comfortably seated, without constraining head movement to within a tight tolerance and without requiring the observer to wear goggles or other device. For fully satisfactory three-dimensional viewing, such a system should provide separate, high-resolution images to right and left eyes. It can also be readily appreciated that such a system is most favorably designed for compactness, to create an illusion of depth and width of field, while occupying as little actual floor space and volume as is possible. For the most realistic viewing experience, the observer should be presented with a virtual image, disposed to appear a large distance away.

It is also known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of the observer's depth perception when the observer is exposed for a period of time to mismatched depth cues for vergence and accommodation. It is also known that this negative effect on depth perception can be mitigated when the accommodation cues correspond to distant image position.

An example of a conventional autostereoscopic display unit is disclosed in U.S. Pat. No. 5,671,992 (Richards), at which a seated observer experiences apparent three-dimensional visual effects created using images generated from separate projectors, one for each eye, and directed to the observer using an imaging system comprising a number of mirrors.

Conventional solutions for stereoscopic imaging have addressed some of the challenges noted above, but there is room for improvement. For example, some early stereoscopic systems employed special headwear, goggles, or eyeglasses to provide the three-dimensional viewing experience. As just one example of such a system, U.S. Pat. No. 6,034,717 (Dentinger et al.) discloses a projection display system requiring an observer to wear a set of passive polarizing glasses in order to selectively direct the appropriate image to each eye for creating a three-dimensional effect.

Certainly, there are some situations for which headgear of some kind can be considered appropriate for stereoscopic viewing, such as with simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat. No. 5,908,300 (Walker et al.) discloses a hang-gliding simulation system in which an observer's head is maintained in a fixed position. While such a solution may be tolerable in the limited simulation environment disclosed in U.S. Pat. No. 5,908,300, and may simplify the overall optical design of an apparatus, constraint of head movement would be a disadvantage in an immersion system. Notably, the system disclosed in U.S. Pat. No. 5,908,300 employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired output pupil size.

A number of systems have been developed to provide stereoscopic effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience. In addition, images displayed using such a system are real images, presented at close proximity to the observer, and thus likely to introduce the vergence/accommodation problems noted above.

It is generally recognized that, in order to minimize vergence/accommodation effects, a three-dimensional viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300. The curved mirror acts as a collimator, providing a virtual image at a large distance from the observer. Another system for stereoscopic imaging is disclosed in "Membrane Mirror Based Autostereoscopic Display for Tele-Operation and Telepresence Applications", in *Stereoscopic Displays and Virtual Reality Systems VII, Proceedings of SPIE,* Volume 3957 (McKay, Mair, Mason, Revie) which uses a stretchable membrane mirror. Although the apparatus disclosed in the McKay article provides a small exit pupil, it is likely that this pupil could be enlarged somewhat simply by scaling the projection optics. However, the apparatus disclosed in the McKay article has limited field of view, due to the use of conventional projection optics and due to dimensional constraints that limit membrane mirror curvature.

Curved mirrors have also been used to provide real images in stereoscopic systems, where the curved mirrors are not used as collimators. Such systems are disclosed in U.S. Pat. No. 4,623,223 (Kempf) and U.S. Pat. No. 4,799, 763 (Davis et al.) for example. However, systems such as these are generally suitable where only a small field of view is needed.

Notably, existing solutions for stereoscopic projection project images onto a flat screen, even where that image is then reflected from a curved surface. One example of a flat screen display is disclosed in U.S. Pat. No. 5,936,774 (Street). However, such display types are prone to undesirable distortion and other image aberration, constraining field of view and limiting image quality overall.

From an optical perspective, it can be seen that there would be advantages to autostereoscopic design using pupil imaging. A system designed for pupil imaging must provide separate images to the left and right pupils correspondingly and provide the most natural viewing conditions, eliminating any need for goggles or special headgear. In addition, it would be advantageous for such a system to provide the largest possible pupils to the observer, so as to allow some freedom of movement, and to provide an ultra-wide field of view. It is recognized in the optical arts that each of these requirements, by itself, can be difficult to achieve. An ideal autostereoscopic imaging system must meet the challenge for both requirements to provide a more fully satisfactory and realistic viewing experience. In addition, such a system must provide sufficient resolution for realistic imaging, with high brightness and contrast. Moreover, the physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in U.S. Pat. No. 3,748,015 minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, requiring separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches. Wide-angle lens systems, capable of angular fields such as would be needed for effective immersion viewing, would be very complex and costly. Typical wide angle lenses for large-format cameras, such as the Biogon™ lens manufactured by Carl-Zeiss-Stiftung in Jena, Germany for example, are capable of 75-degree angular fields. The Biogen™ lens consists of seven component lenses and is more than 80 mm in diameter, while only providing a pupil size of 10 mm. For larger pupil size, the lens needs to be scaled in size, however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistently with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.), in which the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view. Yet another specialized use of ball lens characteristics is disclosed in U.S. Pat. No. 4,854,688 (Hayford et al.) In the optical arrangement of the Hayford et al. patent, directed to the transmission of a CRT-generated two-dimensional image along a non-linear path, such as attached to headgear for a pilot, a ball lens directs a collimated input image, optically at infinity, for a pilot's view.

Another use for wide-angle viewing capabilities of a ball lens is disclosed in U.S. Pat. No. 4,124,798 (Thompson), which teaches use of a ball lens as part of an objective lens in binocular optics for night viewing.

With U.S. Pat. Nos. 4,124,798 and 4,854,688 described above that disclose use of a ball lens in image projection, there are suggestions of the overall capability of the ball lens to provide, in conjunction with support optics, wide field of view imaging. However, there are substantial problems that must be overcome in order to make effective use of such devices for immersive imaging applications, particularly where an image is electronically processed to be projected. For example, conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the LaGrange invariant. Any imaging system conforms to the LaGrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the LaGrange value associated with the device is small. A monocentric imaging system, however, providing a large field of view with a large pupil size (that is, a large numerical aperture), inherently has a large LaGrange value. Thus, when this monocentric imaging system is used with a spatial light modulator having a small LaGrange value, either the field or the aperture of the imaging system, or both, will be underfilled due to such a mismatch of LaGrange values. For a detailed description of the LaGrange invariant, reference is made to *Modern Optical Engineering, The Design of Optical Systems* by Warren J. Smith, published by McGraw-Hill, Inc., pages 42–45.

Copending U.S. patent application Ser. Nos. 09/738,747 and 09/854,699 take advantage of capabilities for wide field of view projection using a ball lens in an autostereoscopic imaging system. In these copending applications, the source image that is provided to the projecting ball lens for each eye is presented as a complete two-dimensional image. The image source disclosed in each of these applications is a two-dimensional array, such as a liquid crystal display (LCD), a digital micromirror device (DMD), or similar device. The image source could alternately be a cathode ray tube (CRT) which, even though generated by a scanned electron beam, presents a complete two-dimensional image to ball lens projection optics.

There are some inherent limitations in providing a complete two-dimensional image. Ideally, a curved image field is preferred, with the center of curvature of this field coincident with the center of the ball lens, since this arrangement minimizes field aberrations. However, providing a curved image field requires either curving the image source itself or providing an additional faceplate or special relay optics in the imaging path. Curving a two-dimensional image array to obtain or approximate spherical curvature of the image source would be difficult and costly. Employing a faceplate or special relay optics with a planar image array has disadvantages including added cost and overall loss of brightness. Maintaining sufficient brightness for projection is a concern when using small two-dimensioned arrays, since this can be difficult to achieve without special design techniques and higher-cost components. Thus, it can be appreciated that there can be improvements to overall cost of system optics for generating and projecting images for stereoscopic viewing.

Ball lenses and ball lens segments have been used as scanning components in sensor applications for wide field-of-view optical scanning. U.S. Pat. No. 6,233,100 (Chen et al.) discloses a concentric sensor scanning system that employs a rotatable scanning ball lens segment with one or more reflective facets. In the system disclosed in U.S. Pat. No. 6,233,100, rotation of a ball lens or ball lens segment directs incoming radiation onto a concentric row of sensors. However, existing projection systems designs have utilized more conventional projector optics components and, in doing this, have overlooked possible deployment of ball lenses or ball lens segments as scanning components for projecting light in a scanned fashion in order to produce an image.

There are a number of techniques used to form a two-dimensional image by scanning, either with either a point source, such as a conventional CRT electron beam, or with a linear source. Copending U.S. patent application Ser. No. 10/010,500 discloses the use of a number of types of linear sources with a scanning system. Among solutions proposed in U.S. patent application Ser. No. 10/010,500 application are LED arrays and resonant fiber optic scanners.

Microelectromechanical devices have been developed as spatial light modulators in a variety of applications, including optical processing, printing, optical data storage, spectroscopy, and display. Microelectromechanical modulators include devices such as grating light valves (GLVs), developed by Silicon Light Machines, Sunnyvale, Calif. and described in U.S. Pat. No. 5,311,360 (Bloom et al.) and electromechanical conformal grating devices as disclosed in U.S. Pat. No. 6,307,663 (Kowarz). These modulators produce spatial variations in phase and amplitude of an incident light beam using arrays of individually addressable devices that are arranged as a periodic sequence of reflective elements forming electromechanical phase gratings. Such microelectromechanical grating devices are of particular interest as linear modulators because they provide sufficient speed for two-dimensional displays and have very good contrast and optical efficiency. At the same time, these devices are mechanically compact and rugged and can be produced at relatively low cost. However, microelectromechanical modulators have been largely overlooked as suitable components for immersive optics applications providing wide field of view. With the advent of low-cost laser light sources, however, there is opportunity for exploiting light-efficient alternatives such as microelectromechanical modulators in intermediate- and large-size immersion display systems. It is necessary, however, to couple this type of light modulation solution with an image projection system that is capable of providing the wide field of view needed for effective immersion optics.

With the advent of digital technology and the demonstration of all-digital projection systems, there is considerable interest in increasing the range or gamut of colors that can be displayed in order to provide a more realistic, more vivid image than is possible with the gamut limitations of film dyes or phosphors. The familiar tristimulus CIE color model developed by Commission Internationale de l'Eclairage (International Commission on Illumination) shows the color space perceived by a standard human observer. FIG. 20 shows the CIE color model, which represents a visible gamut 200 as a familiar "horseshoe" curve. Within visible gamut 200, the gamut of a display device can be represented by a device gamut 202, such as for standard SMPTE (Society of Motion Picture and Television Engineers) phosphors, for example. As is well known in the color projection arts, it is desirable for a display device to provide as much of visible gamut 200 as possible in order to faithfully represent the actual color of an image.

Referring to FIG. 20, pure, saturated spectral colors are mapped to the "horseshoe" shaped periphery of visible gamut 200. The component colors of a display, typically red, green, and blue (RGB) that define the limits of device gamut 202 are ideally as close to the periphery of visible gamut 200 as possible. The interior of the "horseshoe" then contains all mappings of mixtures of colors, including mixtures of pure colors with white, such as spectral red with added white, which becomes pink, for example.

One strategy to increase the size of device gamut 202 is to use component colors from spectrally pure light sources. Lasers, due to their inherent spectral purity, are particularly advantaged for providing a maximized device gamut 202. A second strategy for expanding color gamut is to move from the conventional triangular area of device gamut 202 to a polygonal area, shown as an expanded device gamut 204 in FIG. 21. In order to do this, one or more additional component colors must be added.

There have been projection apparatus solutions proposed that may employ more than three color light sources. For the most part, however, the solutions proposed have not targeted color gamut expansion. Disclosures of projectors using more than three color sources include the following:

U.S. Pat. No. 6,256,073 (Pettit) discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is an "intra-gamut" color addition; in terms of color theory, adding white actually reduces the color gamut. Similarly, U.S. Pat. No. 6,220,710 (Raj et al.) discloses the addition of a white light channel to standard R, G, B light channels in a projection apparatus. As was just noted, the addition of white light may provide added luminosity, but constricts the color gamut.

U.S. Pat. No. 6,191,826 (Murakami et al.) discloses a projector apparatus that uses four colors derived from a single white light source, where the addition of a fourth color, orange, compensates for unwanted effects of spectral distribution that affect the primary green color path. In the apparatus of U.S. Pat. No. 6,191,826, the specific white light source used happens to contain a distinctive orange spectral component. To compensate for this, filtering is used to attenuate undesirable orange spectral content from the green light component in order to obtain a green light having improved spectral purity. Then, with the motive of compensating for the resulting loss of brightness, a separate orange light is added as a fourth color. The disclosure indicates that some expansion of color range is experienced as a side effect. However, with respect to color gamut, it is significant to observe that the solution disclosed in U.S. Pat. No. 6,191,826 does not appreciably expand the color gamut of a projection apparatus. In terms of the color gamut polygon described above with reference to FIGS. 20 and 21, addition of an orange light may add a fourth vertex, however, any added orange vertex would be very close to the line already formed between red and green vertices. Thus, the newly formed gamut polygon will, at best, exhibit only a very slight increase in area over the triangle formed using three component colors. Moreover, unless a substantially pure wavelength orange is provided, there could even be a small decrease in color gamut using the methods disclosed in U.S. Pat. No. 6,191,826.

It is worthwhile to note that none of the solutions listed above has targeted the expansion of the color gamut as a goal or disclosed methods for obtaining an expanded color gamut. In fact, for each of the solutions listed above, there can even be some loss of color gamut with the addition of a fourth color.

In contrast to the above patent disclosures, Patent Application WO 01/95544 A2 (Ben-David et al.) discloses a display device and method for color gamut expansion as shown in FIG. 21 using spatial light modulators with four or more substantially saturated colors. In one embodiment, application WO 01/95544 teaches the use of a color wheel for providing each of the four or more component colors to a single spatial light modulator. In an alternate embodiment, this application teaches splitting light from a single light source into four or more component colors and the deployment of a dedicated spatial light modulator for each component color. However, while the teaching of application WO 01/95544 may show devices that provide improved color gamut, there are several drawbacks to the conventional design solutions disclosed therein. When multiplexing a single spatial light modulator to handle more than three colors, a significant concern relates to the timing of display data. The spatial light modulator employed must provide very high-speed refresh performance, with high-speed support components in the data processing path. Parallel processing of image data would very likely be required in order to load pixel data to the spatial light modulator at the rates required for maintaining flicker-free motion picture display. It must also be noted that the settling time for conventional LCD modulators, typically in the range of 10–20 msec for each color, further shortens the available projection time and thus constrains brightness. Moreover, the use of a filter wheel for providing the successive component colors at a sufficiently high rate of speed has further disadvantages. Such a filter wheel must be rotated at very high speeds, requiring a precision control feedback loop in order to maintain precision synchronization with data loading and device modulation timing. The additional "dead time" during filter color transitions, already substantial in devices using three-color filter wheels, would further reduce brightness and complicate timing synchronization. Coupling the filter wheel with a neutral density filter, also rotating in the light path, introduces additional cost and complexity.

Although rotating filter wheels have been adapted for color projection apparatus, the inherent disadvantages of such a mechanical solution are widely acknowledged. Alternative solutions using a spatial light modulator dedicated to each color introduce other concerns, including proper alignment for component colors. The disclosure of application WO 01/95544 teaches the deployment of a separate projection system for each color, which would be costly and would require separate alignment procedures for each display screen size and distance. Providing illumination from a single light source results in reduced brightness and contrast. Thus, while the disclosure of application WO 01/95544 teaches gamut expansion in theory, in practice there are a number of significant drawbacks to the design solutions proposed. As a studied consideration of application WO 01/95544 clearly shows, problems that were difficult to solve for three-color projection, such as timing synchronization, color alignment, maintaining brightness and contrast, cost of spatial light modulators and overall complexity, are even more challenging when attempting to use four or more component colors.

Conventional components for combining modulated colored light for projection include X-cubes, also termed X-prisms, and Philips prisms. These conventional components are designed for combining three input colors onto a common multicolor output optical axis. However, adding a fourth color in the modulation path introduces added complexity. It can be seen that there would be advantages in solutions that use the same components for three-color as well as four-, five-, or six-color projection apparatus.

In spite of the shortcomings of prior art solutions, it is recognized that there would be significant advantages in providing an immersive imaging experience with an expanded color gamut. Natural colors could be more realistically reproduced. At the same time, computer-generated images, not confined to colors and tones found in nature, could be represented more dramatically. Thus, there is a need for an improved autostereoscopic imaging solution for viewing images having an expanded color gamut, where the solution provides a structurally simple apparatus, minimizes aberrations and image distortion, and meets demanding requirements for wide field of view, large pupil size, high brightness, and lowered cost.

SUMMARY OF THE INVENTION

It is an object of the present invention to provide an autostereoscopic display apparatus having an expanded color gamut. With this object in mind, the present invention provides an autostereoscopic optical apparatus for displaying a color stereoscopic image comprising a left image and a right image, the apparatus having an image generation system comprising at least four light sources, each light source having a different color.

In a preferred embodiment, the present invention provides an autostereoscopic optical apparatus for displaying a multicolor stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left two-dimensional intermediate image and a right image generation system for forming a right two-dimensional intermediate image, wherein both left and right image generation systems are similarly constructed of separate components, with each image generation system comprising:

(a1) a first light source of a first color for providing a first incident beam, a second light source of a second color for providing a second incident beam, a third light source of a third color for providing a third incident beam, and a fourth light source of a fourth color for providing a fourth incident beam;

(a2) a multicolor linear array modulator for forming, on a diffusive surface, a multicolor line of source pixels by modulating said first, second, third, and fourth incident beams to provide a corresponding first, second, third, and fourth modulated beam; by combining the first, second, third, and fourth modulated beams onto a common axis to form a multicolor modulated beam; and by directing the multicolor modulated beam toward the diffusive surface;

(a3) a scanning ball lens assembly for projecting the multicolor line of source pixels to form an intermediate line image, the scanning ball lens assembly comprising:

(a3a) at least one reflective surface for reflecting light from the multicolor line of source image pixels to the intermediate line image;

(a3b) a ball lens segment having a scanning ball lens pupil, the ball lens segment having a center of curvature on said at least one reflective surface; the scanning ball lens assembly rotating about an axis and forming a series of adjacent the intermediate line images in order to sequentially form the two-dimensional intermediate image thereby;

(b) a curved mirror having a center of curvature placed substantially optically midway between the scanning ball lens assembly for the left image generation system and the scanning ball lens assembly for the right image generation system;

(c) a beamsplitter disposed to fold the optical path from the left image generation system to form the left two-dimensional intermediate image near a front focal surface of the curved mirror and to fold the optical path from the right image generation system to form the right two-dimensional intermediate image near the front focal surface of the curved mirror; and the curved mirror forming the virtual stereoscopic image of the left and right two-dimensional intermediate images and, through the beamsplitter, forming a real image of the left scanning ball lens pupil at the left viewing pupil and a real image of the right scanning ball lens pupil at the right viewing pupil.

The present invention allows use of either linear (one-dimensional) or spatial (two-dimensional) light modulation devices.

A feature of the present invention is the use of four or more colors having spectral purity and high saturation, allowing expansion of the color gamut for stereoscopic imaging.

A further feature of the present invention is the use of a monocentric arrangement of optical components, thus simplifying design, minimizing aberrations and providing a wide field of view with large exit pupils.

A further feature of the present invention is that it allows a number of configurations, including configurations that minimize the number of optical components required, even including configurations that eliminate the need for a beamsplitter.

It is a further advantage of the present invention that it allows use of inexpensive, bright light sources for generating an intermediate image for projection. The high spectral purity of laser sources helps to maximize the achievable color gamut for a display apparatus.

It is a further advantage of the present invention that it allows controlled selection of the number of colors used for projecting stereoscopic left- and right-eye images.

It is a further advantage of the present invention that it allows compact arrangement of optical components, capable of being packaged in a display system having a small footprint.

It is a further advantage of the present invention that it provides a solution for wide field stereoscopic projection that is inexpensive when compared with the cost of conventional projection lens systems.

It is a further advantage of the present invention that it provides stereoscopic viewing without requiring an observer to wear goggles or other device.

It is yet a further advantage of the present invention that it provides an exit pupil of sufficient size for non-critical alignment of an observer in relation to the display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
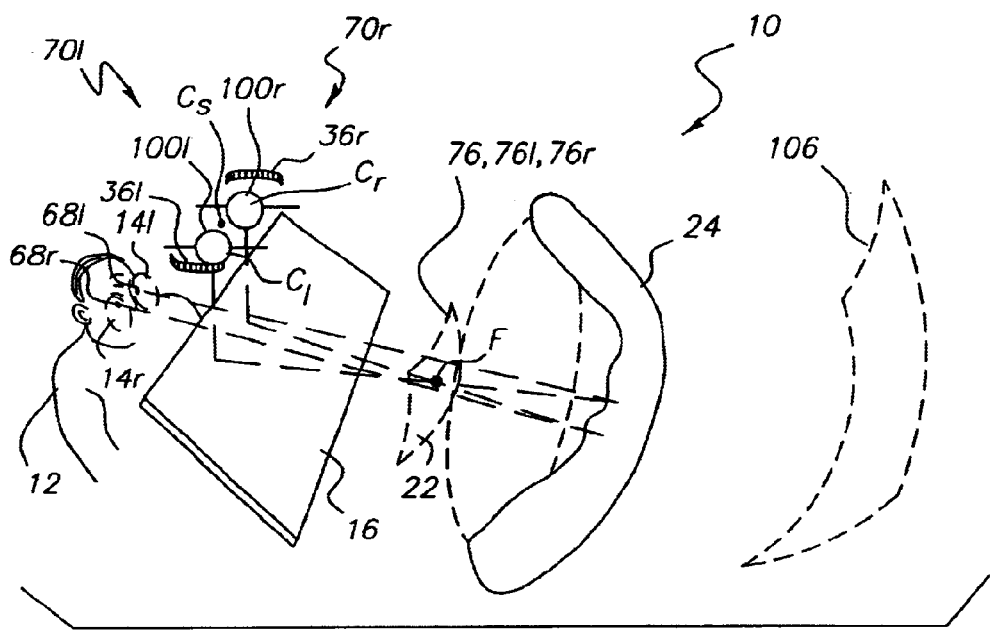
FIG. 1 is a perspective view showing key components of the apparatus of the present invention in an autostereoscopic imaging system.

Referring to FIG. 1, there is shown a perspective view of an autostereoscopic imaging system 10. An observer 12 is typically seated in position to view a virtual stereoscopic image from left and right viewing pupils 14*l* and 14*r*. Optimal viewing conditions are obtained when left and right eye pupils 68*l* and 68*r* of observer 12 are coincident with the position of corresponding left and right viewing pupils 14*l* and 14*r*.

A left image generation system 70*l*, comprising a left scanning ball lens assembly 100*l* and a left line of source pixels 36*l* as a linear image source, projects the image intended for left viewing pupil 14*l*. Correspondingly, a right image generation system 70*r*, comprising a right scanning ball lens assembly 100*r* and a right line of pixels 36*r* as a linear image source, projects the image intended for right viewing pupil 14*r*. Left image generation system 70*l* directs an image to a beamsplitter 16 which is interposed between observer 12 and a curved mirror 24. A left intermediate image 76*l* is formed near a focal surface 22 of curved mirror 24. Left intermediate image 76*l* is presented at left pupil 14*l* as a virtual image 106, which appears to observer 12 as if the image is behind curved mirror 24. In similar fashion, right image generation system 70*r* directs an image to beamsplitter 16 which is interposed between observer 12 and curved mirror 24. A right intermediate image 76*r* is thereby formed near focal surface 22 of curved mirror 24. Right intermediate image 76*r* is presented at right pupil 14*r* as a virtual image 106, which appears to observer 12 as if the image is behind curved mirror 24. As a result, observer 12 is presented with a virtual stereoscopic image that comprises separate left and right images. The virtual stereoscopic image appears to be behind curved mirror 24, somewhere between the rear of curved mirror 24 and infinity.

The description that follows primarily focuses on the optical components that direct light to either one of viewing pupils 14*l* and 14*r*. It should be noted that similar optical components are employed for left image generation system and right image generation system, that is, for both left and right optical paths. For clarity, the description that follows applies to both right and left image generation system 70 components. Any distinction between right and left optical paths is made only when it is necessary to be precise. (Appended left "l" or right "r" designators for part numbers are, for this reason, omitted from this description unless needed.)

It must be noted that, as shown in FIG. 1, there are two components to the stereoscopic image seen by observer 12. As is represented in FIG. 1, the left and right optical paths cross in system 10, due to imaging by curved mirror 24.

FIG. 1 illustrates some of the key problems to be solved, from an optical design perspective, and shows an overview of the solution provided by the present invention. It is instructive to review key design considerations for achieving the most life-like stereoscopic viewing. In order to provide observer 12 with an effective immersion experience, a wide field of view is important, in excess of the 60 degrees available using prior art techniques. In order to be used comfortably by observer 12, viewing pupils 14*l*, 14*r* must be sufficiently large. As a design goal, autostereoscopic imaging system 10 of the present invention is intended to provide a field of view of at least 90 degrees with the diameter of viewing pupil 14 in excess of 20 mm diameter. To provide a viewable stereoscopic virtual image over a range of human interocular separations, scanning ball lens assemblies 100*l* and 100*r* are advantageously separated by an appropriate, empirically determined interaxial distance.

Alternately, the interaxial distance between scanning ball lens assemblies 100*l* and 100*r* could be manually adjusted to suit interocular dimensions of observer 12 or could be automatically sensed and adjusted by autostereoscopic imaging system 10. Components of left and right image generation systems 70*l* and 70*r* could be mounted on a boom, for example, allowing movement of each image generation system 70*l*, 70*r* relative to the other in order to compensate for interocular distance differences. Reference is made to commonly-assigned U.S. patent application Ser. No. 09/854,699, which describes automated sensing and adjustment of left- and right-eye projection assemblies using ball lenses. The same feedback loop apparatus and methods disclosed in this earlier application could also be applied for the apparatus of the present invention.

Monocentric Design of Image Path

Figure 2A:
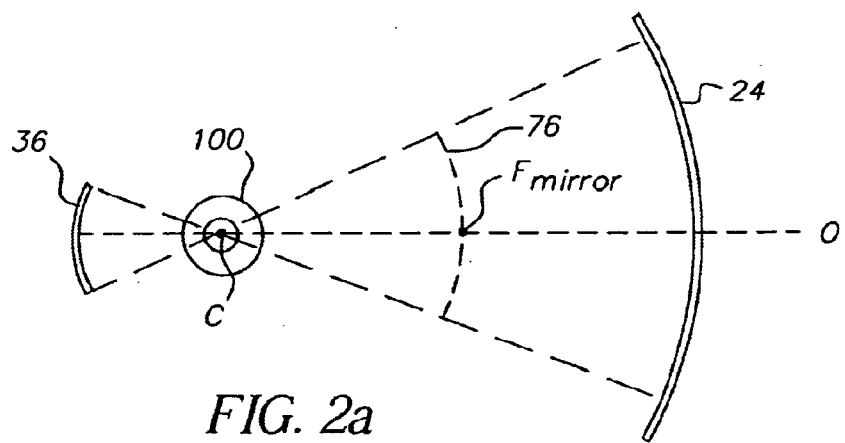
FIGS. 2a and 2b are side and top schematic views, respectively, showing the substantially concentric relationship of projection optics in an optically unfolded view.
Figure 2B:
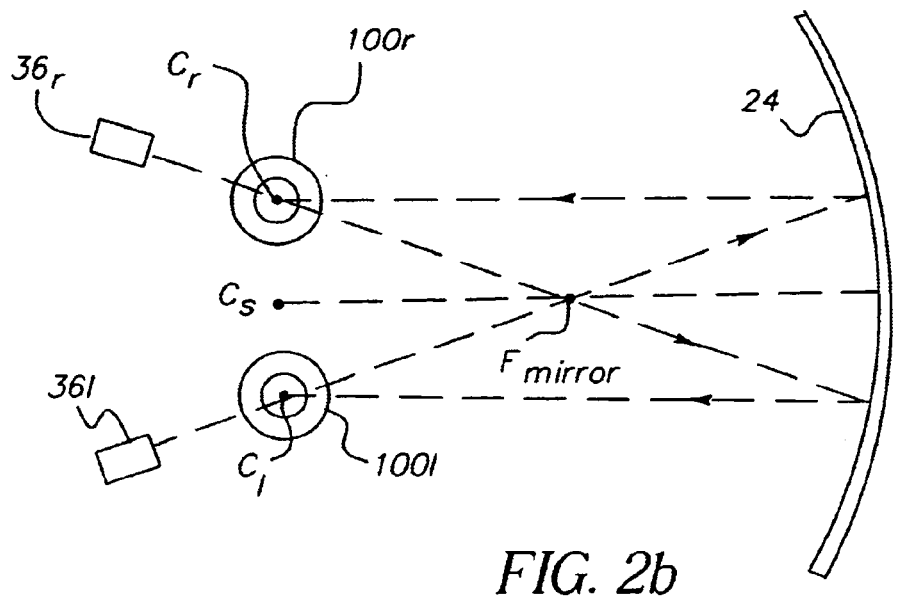

The monocentric arrangement of optical components in the apparatus of the present invention provides a number of clear advantages for minimizing image aberrations and for maximizing field of view. Referring to FIG. 2*a*, there is shown, from a side view, the optically concentric relationship of key components in the optical path, in unfolded form, applicable for both left and right image generation systems 70*l* and 70*r*. Referring to the top view of FIG. 2*b*, also in unfolded form, the center of curvature of mirror 24 is $C_s$, located midway between left and right scanning ball lens assemblies 100*l* and 100*r*. In the general scheme shown in FIG. 2*a*, line of source pixels 36, is preferably curved with the center of its radius of curvature at the center labeled C, which corresponds to center $C_l$ or $C_r$ of left or right scanning ball lens assemblies 100*l* or 100*r* as shown in FIG. 2*b*. Line of source pixels 36 generates a narrow line of the image to be projected, one line at a time. Scanning ball lens assembly 100 projects line of source pixels 36 to form intermediate image 76. As is represented in FIG. 2*a*, intermediate image 76 is also curved, sharing the same center of curvature as scanning ball lens assembly 100, at center C. Referring to FIGS. 1 and 2*a*, intermediate image 76 is located near focal surface 22 of curved mirror 24. Focal point $F_{mirror}$ of curved mirror 24 lies at the intersection of focal surface 22 with optical axis O. Curved mirror 24 is preferably spherical, again sharing the same center of curvature as scanning ball lens assembly 100 at center C.

It is instructive to observe that FIG. 2*a* gives a generalized, first approximation of the relationship of components in the unfolded optical path. Referring more closely to the top view of FIG. 2*b*, there is shown the actual position of the center of curvature of curved mirror 24, labeled $C_s$ in FIG. 2*b*, midway between the centers of curvature of left and right scanning ball lens assemblies 100*l* and 100*r*, labeled $C_l$ and $C_r$ respectively. It is also instructive to observe that the ideal placement of left and right scanning ball lens assemblies 100*l* and 100*r* for observer 12 would be such that their real images, formed by curved mirror 24, would correspond with the position and interocular separation of left and right viewing pupils 14*l* and 14*r*, respectively.

Referring back to FIG. 1 by way of reference, the optimal position of intermediate image 76 is within a range that can be considered "near" focal surface 22. The preferred range extends from focal surface 22 itself as an outer limit to within approximately 20% of the distance between focal surface 22 and the surface of curved mirror 24 as an inner limit. If intermediate image 76 were formed between focal surface 22 and observer 12, virtual image 106 would appear to be out of focus.

Because scanning lens assembly 100 is spherical with center of curvature at center C, as the unfolded arrangement of FIG. 2*a* shows, a wide field of view can be provided, with minimal image aberration. It must be noted that the design of the present invention is optimized for unity pupil magnification; however, some variation from unity pupil magnification is possible, within the scope of the present invention.

Figure 3:
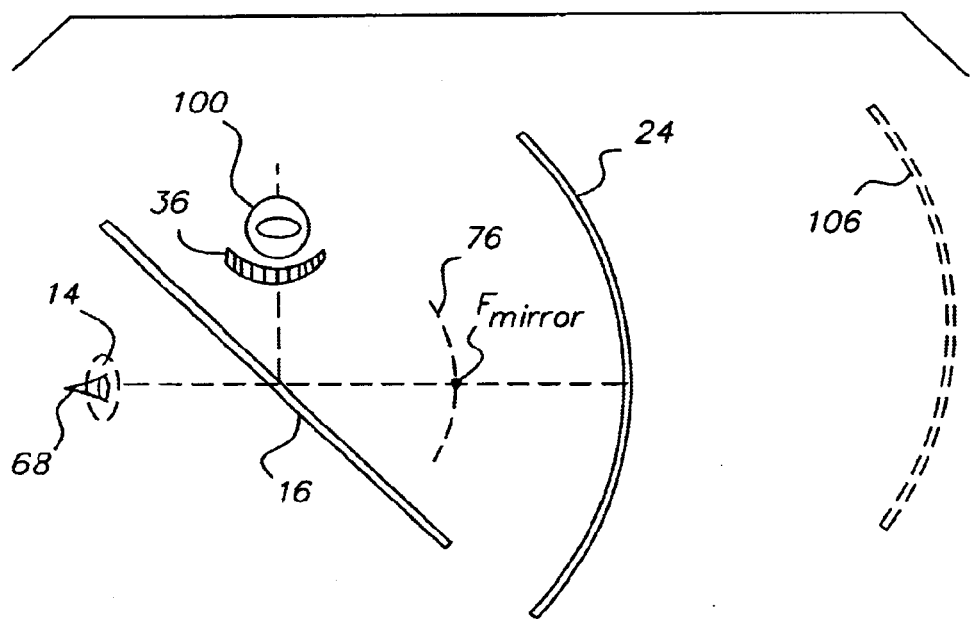
FIG. 3 is a schematic view showing the concentric relationship of projection optics as used by the system, in an optically folded view.

FIG. 3 shows a side view of the folded optical arrangement represented in FIG. 2*a*, showing how viewing pupil 14 is formed by the addition of beamsplitter 16. Beamsplitter 16 directs the light projected from scanning ball lens assembly 100 to form intermediate image 76. Virtual image 106 formed by curved mirror 24 is thereby visible, through beamsplitter 16, at viewing pupil 14.

The optical paths represented in FIG. 2*a* and FIG. 3, and following are duplicated, with independent left and right image generation systems 70*l* and 70*r*. Typically, separate image-forming components are used within each image generation system 70*l* and 70*r*. Subsequent material in this application describes alternate approaches, wherein one set of image-forming components can be multiplexed in order to generate both left- and right-eye images.

Using Line of Source Pixels 36

Scanning ball lens assembly 100 functions as both a reflective scanner and as a projection lens. Referring to FIGS. 4–7, both scanning and projection functions are shown. A reflective surface 102 within scanning ball lens assembly, as is shown in FIG. 5, performs the scanning function, much like the scanning mirror familiar in the optical scanning arts. In this scanning function, scanning ball lens assembly 100 rotates about an axis A in order to sequentially project each individual line of intermediate image 76 from the corresponding line of source pixels 36.

Referring to FIG. 5, line of source pixels 36 provides, for projection, a sequence of individual source pixels 104, in a linear arrangement. As is particularly shown in FIG. 5, the overall shape of line of source pixels 36 is preferably curved so that each source pixel 104 is at an equivalent radial distance r from center C of scanning ball lens assembly 100. Image generation system 70 is itself controlled by imaging logic circuitry (not shown), using scan synchronization techniques familiar to the imaging arts. In a simple configuration, line of source pixels 36 in FIG. 5 could be generated using a curved LED array, so that each source pixel 104 corresponds to a single LED. With such an arrangement, the curved LED array itself would form a diffusive source, with light modulated directly at the LEDs. This allows the modulation of each individual source pixel 104, using any of the well-known techniques for modulating light output. Conventional methods include pulse-width modulation and amplitude modulation, for example. Bit-oriented pulse-width modulation could be used, for example, whereby the total energy delivered to line of source pixels 36 is the sum of pulse widths having, for example, a bit depth of eight bits. Amplitude modulation operates by simply varying the light level in each individual source pixel 104 of line of source pixels 36. A combination of pulse-width modulation with amplitude modulation could alternately be used to provide expanded dynamic range. Subsequent material describes a number of alternative methods for forming line of source pixels 36 at an image-forming surface having the preferred geometry and diffusive properties.

Scanning Activity

Figure 5:
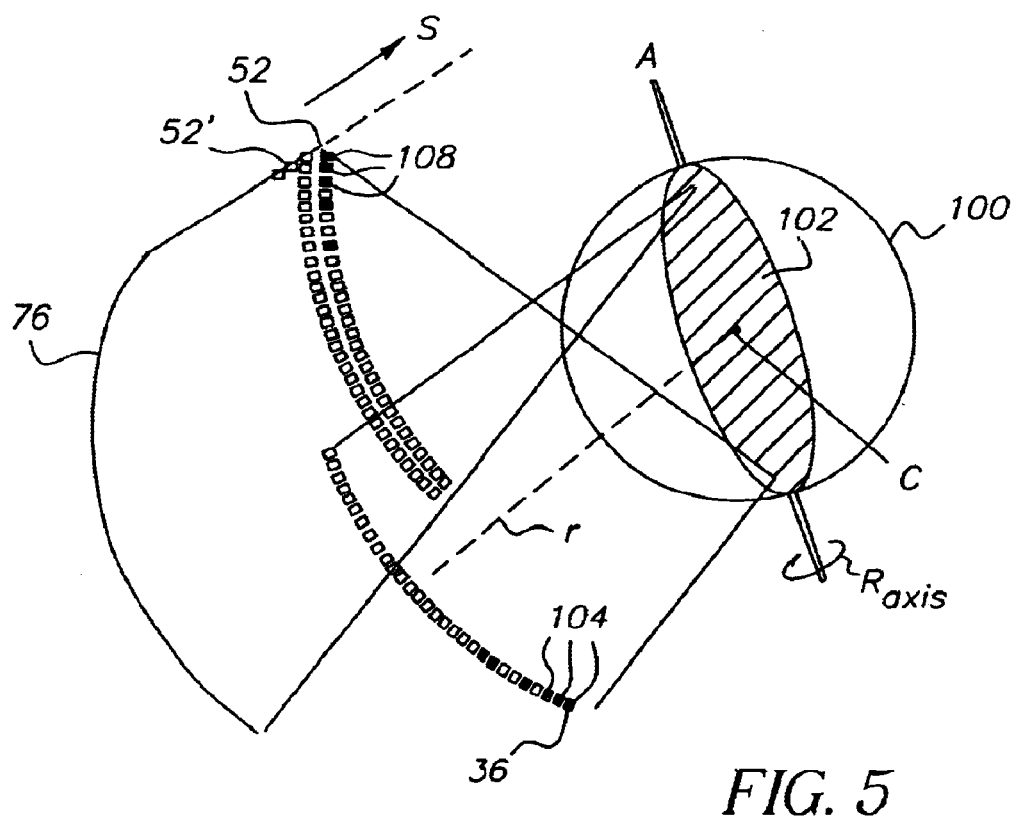
FIG. 5 is a perspective view representation showing, in exaggerated detail, how successive lines of source pixels form a curved linear image source projected by the scanning ball lens assembly to form a two-dimensional intermediate image.
Figure 6A:
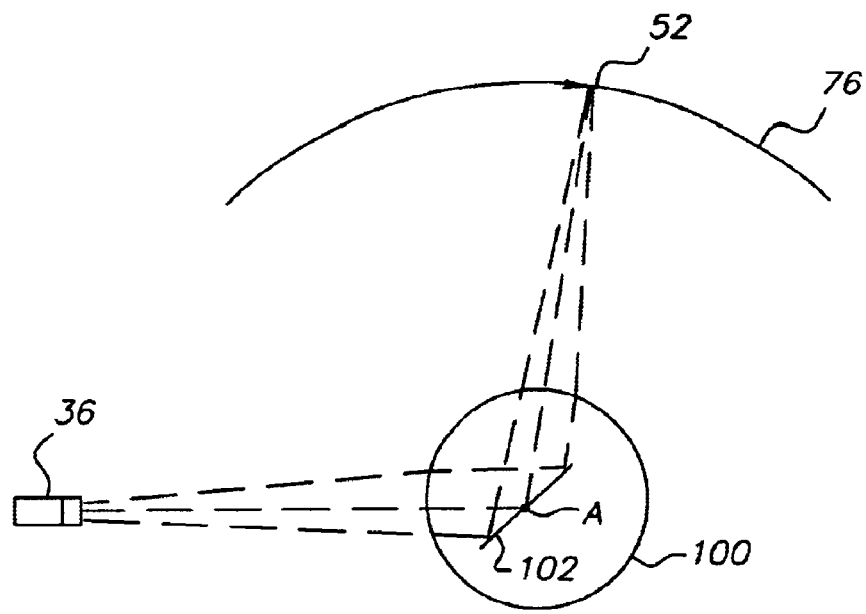
FIGS. 6a–6c are top views showing the relationship of the curved linear image source and scanning ball lens assemblies and the interaction of these components in order to create a scanned intermediate image.

Referring jointly to FIGS. 5 and 6*a*, the scanning action by which scanning ball lens assembly 100 projects line of source pixels 36 from its reflective surface 102 to form an intermediate line image 52, which comprises a line of image pixels 108, is represented. For illustration, only a small number of source pixels 104 are represented in FIG. 5. In a preferred embodiment, line of source pixels 36 provides a line containing at least a few hundred individual source pixels 104, each individual source pixel 104 imaged to a corresponding image pixel 108 within intermediate line image 52. As scanning ball lens assembly 100 rotates about axis A in the $R_{axis}$ direction, successive intermediate line images 52 are formed. In this way, intermediate line image 52' is formed at one instant, then, after a predetermined rotation distance of scanning ball lens assembly 100, the next intermediate line image 52 is formed, and so on. Due to the characteristics of scanning ball lens assembly 100 projection, source pixels 104 are inverted from line of source pixels 36 to form intermediate line image 52. As indicated in FIG. 5, this continuing activity forms intermediate image 76 by scanning in the S direction.

Referring back to FIG. 4, there is shown a perspective view of the scanning action of image generation system 70 for forming intermediate image 76 near focal surface 22 of curved mirror 24. It is instructive to note that the apparatus and method of the present invention allow the aspect ratio of intermediate image 76 to be variable within a range. With reference to FIG. 5, the length of line of source pixels 36 can be a value less than the maximum available line length. In the orthogonal direction, the number of intermediate line images 52 formed can also be less than the maximum number of lines available. By varying the number of activated pixels 104 and number of intermediate line images 52 created, image generation system 70 can thereby optimize the aspect ratio of intermediate image 76 to suit both the performance characteristics of autostereoscopic imaging system 10 and the preferences of observer 12.

Figure 6B:
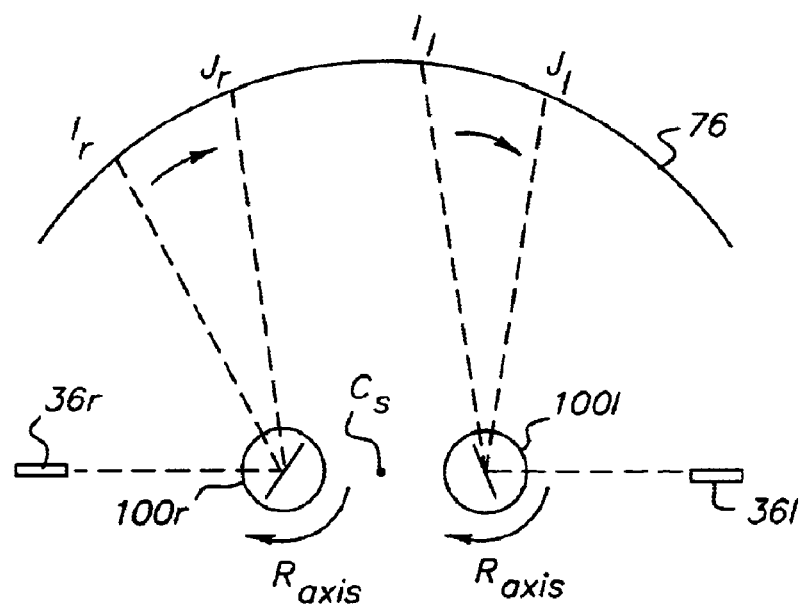
Figure 6C:
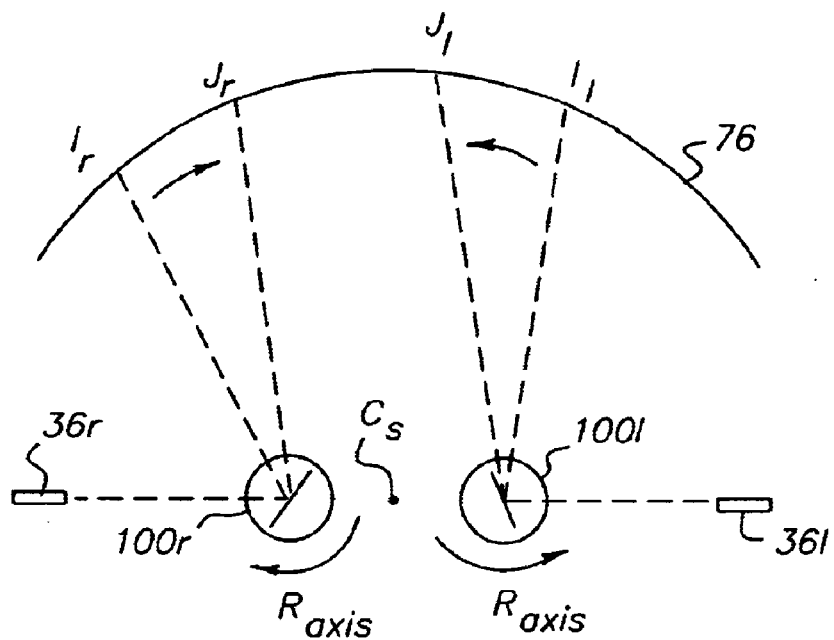

Referring again to FIG. 6*a*, there is shown a top view of the rotation of scanning ball lens assembly 100 for forming intermediate image 76, one intermediate line image 52 at a time. As has been noted, intermediate image 76 is formed by the scanning action of both left and right scanning ball lens assemblies 100*l* and 100*r*. Referring to FIGS. 6*b* and 6*c*, there are shown alternate ways in which left and right scanning ball lens assemblies 100*l* and 100*r* may rotate with respect to each other. In the example of FIG. 6*b*, both right and left scanning ball lens assemblies 100*l* and 100*r* rotate in the same direction as they sweep out intermediate line images 52 from an initial position $I_l$ and $I_r$ to a subsequent position $J_l$ and $J_r$, respectively. By contrast, FIG. 6*c* shows left and right scanning ball lens assemblies 100*l* and 100*r* rotating in the opposite direction. Either type of relative motion pattern could be used in an image generation system 70.

Figure 4:
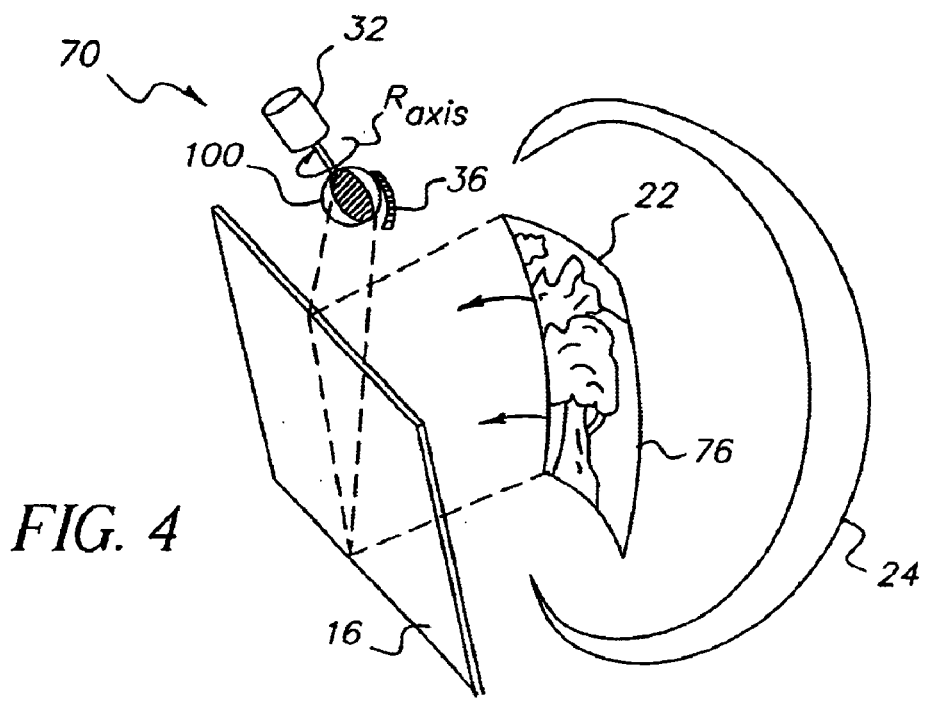
FIG. 4 is a perspective view showing, for one left or right image, the scanning action obtained from cooperation of the linear image generation system and scanning ball lens assembly.

As is shown in FIG. 4, a motor 32 is used to drive the rotation of scanning ball lens assembly 100. In a preferred embodiment, the rotational speed of scanning ball lens assembly 100 is 1800 RPM. Of course, by using a series of gears, belts, or other components for drive translation, with techniques well known in the mechanical arts, both left and right scanning ball lens assemblies 100*l* and 100*r* could be driven using a single motor 32.

Fabrication of Scanning Ball Lens Assembly 100

Figure 7:
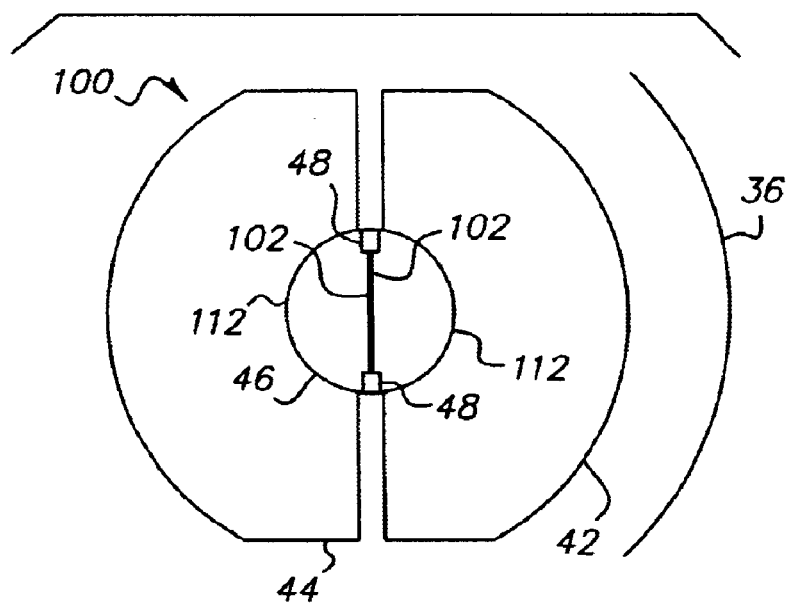
FIG. 7 is a cross-section view showing the composition of a scanning ball lens assembly.

Referring to FIG. 7, there is shown, in cross-sectional view, the structure of scanning ball lens assembly 100 in a preferred embodiment. A central spherical lens 46 is disposed between two meniscus lenses 42 and 44. Meniscus lenses 42 and 44 have indices of refraction and other characteristics intended to minimize on-axis spherical and chromatic aberration, as is well known in the optical design arts. Stops 48 limit the entrance pupil within scanning ball lens assembly 100. Stops 48 need not be physical, but may alternately be implemented using total internal reflection at the interfaces between outer meniscus lens 42 and spherical lens 46.

In a preferred embodiment, meniscus lenses 42 and 44 are selected to reduce image aberration and to optimize image quality at intermediate image 76. It must be noted that scanning ball lens assembly 100 could comprise any number of arrangements of support lenses surrounding central spherical lens 46. Surfaces of these support lenses, however many are employed, would share a common center of curvature C with central spherical lens 46. Moreover, the refractive materials used for lens components of scanning ball lens assembly 100 could be varied, within the scope of the present invention. For example, in addition to standard optical glass lenses, central spherical lens 46 could be plastic, with meniscus lenses 42 and 44 made of glass, plastic, enclosed liquids, or other suitable refractive materials, all within the scope of the present invention. In its simplest embodiment, scanning ball lens assembly 100 could be simply a single central spherical lens 46 with its reflective surface 102.

A planar reflective surface 102 can be fabricated in a number of different ways. In a preferred embodiment, reflective surface 102 is two-sided, formed on one half of the hemisphere used for spherical lens 46, using an aluminum coating. Scanning ball lens assembly 100 is then assembled, typically using an optical cement, to provide reflective surface 102 on the meridional plane of scanning ball lens assembly 100, with two opposite reflective sides. As another option, at higher cost, a broadband interference coating could be applied to either or both hemispheres of spherical lens 46 for improved reflectivity. Reflective surface 102 may be formed over the full surface area of the meridional plane as is represented in FIG. 5. Alternately, depending on the geometry of display optics, reflective surface 102 may occupy only a central portion of the meridional plane of scanning ball lens 100, as is represented in FIG. 7.

Referring again to FIG. 7, the optimal arrangement for mechanical rotation is to provide reflective surface 102 as a two-sided mirror, so that a hemispheric lens segment 112 is disposed on top of each reflective surface 102. As an alternative, the lens structure of scanning ball lens assembly 100 could simply be a single hemispheric lens segment 112, with only a one-sided reflective surface 102. In that case, however, other mechanical techniques for partial rotation of scanning ball lens assembly 100 would need to be employed. For example, it would be possible to use scanning ball lens assembly 100 having only one hemispheric lens segment 112, so that reflective surface 102 is one-sided. Using full rotation with such arrangement, however, would reduce the scanner duty cycle by a factor of two. In such a case, options available for maximizing speed of an autostereoscopic imaging system 10 would include mechanical devices that provide reciprocating motion for scanning by scanning ball lens assembly 100. Such an approach, however, would add cost and mechanical complexity and might also require compensation for non-uniform scan velocity.

It is instructive to note that scanning ball lens assembly 100 cannot operate throughout its full rotation, but would have some restriction on its usable range or duty cycle. Where this may be a limiting factor, reciprocating motion of scanning ball lens assembly 100 could provide improved duty cycle that may justify the added cost and mechanical complexity.

It can be appreciated that the arrangement of components shown in FIGS. 1–7 present a novel approach to the challenge of achieving wide field of view in a projection system.

Linear Array Modulator Embodiments for Image Generation System 70

Figure 8A:
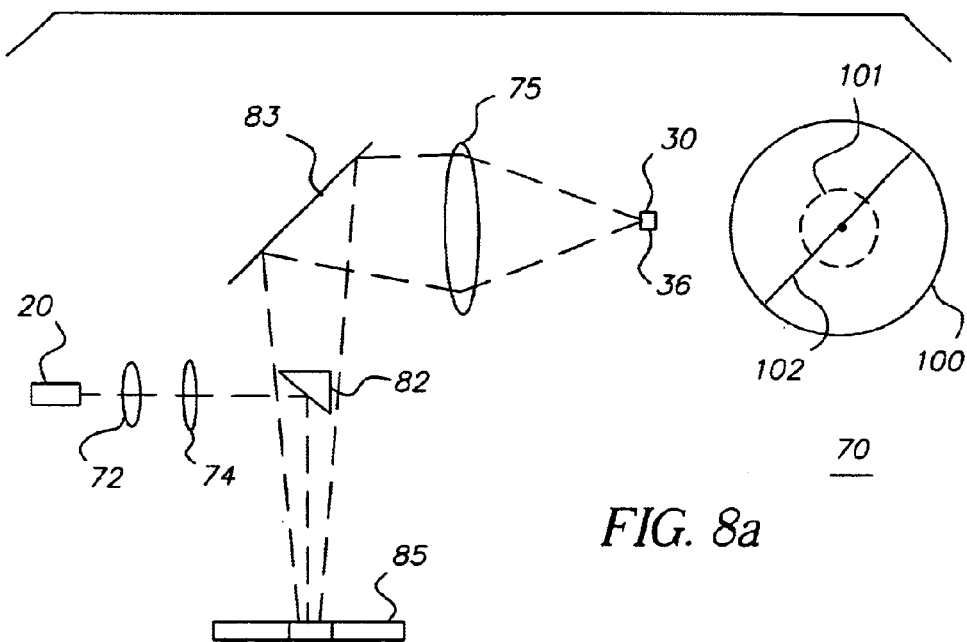
FIG. 8a is a schematic view showing the line-scanning mechanism for a single color in the image generation system of the present invention.

Referring to FIG. 8*a*, there is shown a schematic diagram of image generation system 70 for a single color channel, in a preferred embodiment. A light source 20 provides illumination that is directed toward a turning mirror 82, through a spherical lens 72 and a cylindrical lens 74. Light reflected from turning mirror 82 is modulated at an electromechanical grating light modulator 85. Modulated diffracted light from electromechanical grating light modulator 85 is diffracted past turning mirror 82, folded at a mirror 83, and directed by lens 75 onto a diffusive surface 30 in order to form line of source pixels 36. As a general principle, optical efficiency is a function of the number of diffracted orders captured from electromechanical grating light modulator 85. For high optical efficiency and high contrast in a preferred embodiment, line of source pixels 36 is preferably formed from two or more diffracted orders of the modulated light from electromechanical grating light modulator 85. Reflective surface 102 within scanning ball lens assembly 100 then projects line of source pixels 36 in order to form intermediate image 76, as is shown in FIGS. 4, 5, 6*a*, 6*b*, and 6*c*.

In order to provide the needed brightness and spectral content for high-quality immersive imaging with a broad color gamut, light source 20 is a laser in the preferred embodiment. For example, red light source 20*r* can be a single-mode laser diode from Sharp Corporation.

In a preferred embodiment, electromechanical grating light modulator 85 is an electromechanical conformal grating device as disclosed in U.S. Pat. No. 6,307,663. Such devices have performance advantages over other types of grating light modulators, including optimal positioning of the plane of diffraction and improved spatial separation. Other types of grating light modulators, such as GLV devices, could alternately be used.

Diffusive surface 30 provides a curved image-forming surface on which line of source pixels 36 is formed. Referring again to FIG. 8*a*, observe that scanning ball lens assembly 100 has a ball lens pupil 101. Diffusive surface 30 is required because it is necessary to substantially fill ball lens pupil 101 uniformly in order to provide a uniform viewing pupil 14. In a preferred embodiment, diffusive surface 30 is a fiber optic faceplate, such as those manufactured by Incom, Inc., Charlton, Mass. for example. Diffusive surface 30 could alternately be fabricated from an etched or ground transparent substrate such as glass or a suitable polymer material, whose surface has the appropriate curvature for forming line of source pixels 36. Diffusive surface 30 could alternately be formed by applying a diffusive coating onto a suitable transparent substrate that is appropriately curved or onto a fiber optic faceplate. Lens 75 is designed to provide a negative field curvature appropriate for forming line of source pixels 36 on curved diffusive surface 30.

Figure 8B:
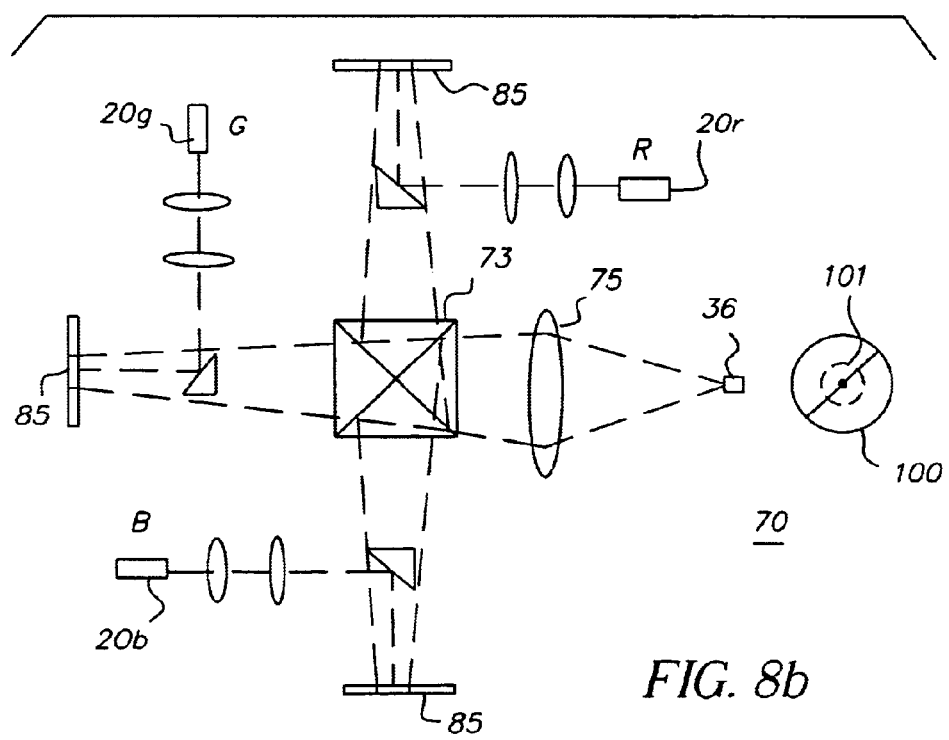
FIG. 8b is a schematic view showing a composite, three-color arrangement of components for the image generation system.

Referring to FIG. 8b, there is shown an arrangement of image generation system 70 as a multicolor linear modulator for combining three primary colors to form line of source pixels 36 as a full-color image. A red light source 20r, a green light source 20g, and a blue light source 20b are separately modulated, each at its respective electromechanical grating light modulator 85. A color combining cube 73 is then used to combine the modulated red, green, and blue (RGB) light for forming line of source pixels 36 on diffusive surface 30. The preferred embodiment uses RGB color, however, use of alternate colors is possible. In addition, four or more colors could be combined to provide an expanded color gamut, as is described subsequently.

Color combining cube 73 is an X-cube or X-prism in the preferred embodiment. Alternately, other color-combining components could be employed, such as Philips prisms, for example. Or, an arrangement of dichroic surfaces could be provided for color synthesis, combining the modulated light from each color path, as is well-known in the digital image projection arts.

Options for Curved Mirror 24 Arrangement

As is shown with respect to FIGS. 1, 2a, 2b, and 3, curved mirror 24 serves as a reflective image-forming surface within autostereoscopic imaging system 10. To match the interocular distance of observer 12, the actual shape of curved mirror 24 can be adjusted to vary to some degree from a precise spherical shape. An aspheric shape could be used for curved mirror 24, to minimize off-axis pupil aberration, for example.

Curved mirror 24 can be a fairly expensive component to fabricate using traditional forming, grinding, and polishing techniques. It may be more practical to fabricate mirror 24 from two or more smaller mirror segments, joined together to assemble one large mirror 24.

As yet another alternative embodiment, curved mirror 24 may comprise a membrane mirror, such as a stretchable membrane mirror (SMM), whose curvature is determined by a controlled vacuum generated in an airtight cavity behind a stretched, reflective surface. Use of a stretchable membrane mirror is disclosed in the McKay article, referenced above.

Curved mirror 24 can alternately be embodied a replicated mirror, such as the replicated mirrors manufactured by Composite Mirror Applications, Inc., Tuscon, Ariz., for example. Single, curved replicated mirrors fabricated using composite replicated mirror technology offer particular advantages for cost, weight, and durability. Other possible alternatives for curved mirror 24 include Fresnel mirrors, or retroreflective mirrors or surfaces.

Figure 9:
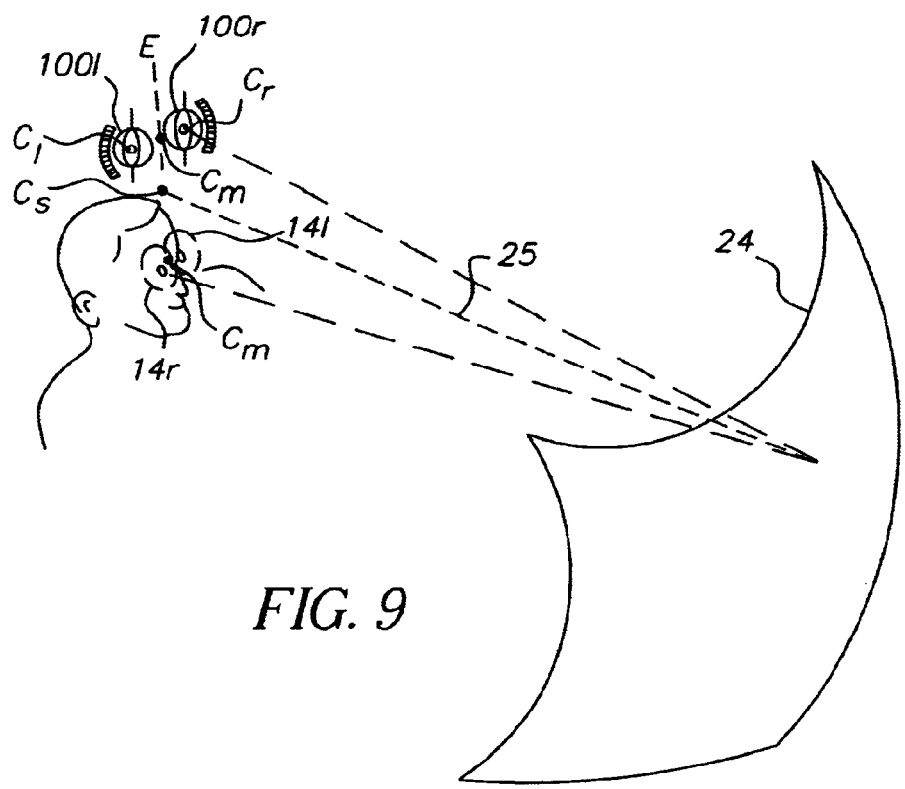
FIG. 9 is a perspective view showing key components of the apparatus of the present invention for an alternate embodiment autostereoscopic imaging system using a curved mirror and essentially paraxial optics.

Referring to FIG. 9, there is shown an alternate, substantially monocentric arrangement in which left and right scanning ball lens assemblies 100l and 100r, disposed near an optical axis 25, project directly into curved mirror 24, without the use of beamsplitter 16, as was shown in FIGS. 1–4. For such an arrangement, curved mirror 24 must have acceptable off-axis performance, since the image path for each viewing pupil 14l and 14r must be more than slightly off-center relative to the center of curvature $C_s$ of curved mirror 24. Aspheric mirrors could be employed for such an arrangement. In order for the arrangement of FIG. 9 to be feasible, the ratio of off-axis distance ($C_s$ to $C_m$ in FIG. 9) to the focal length of spherical curved mirror 24 must be small. As a rule-of-thumb, it has been determined that curved mirror 24 with a spherical surface can perform satisfactorily provided that the off-axis angle of left and right scanning ball lens assemblies 100l and 100r is within approximately six degrees.

For off-axis angles in excess of six degrees, an aspherical surface for curved mirror 24 is more suitable. For such an aspherical surface, a first center of curvature point $C_m'$ is located midway between viewing pupils 14l and 14r. A second center of curvature point $C_m$ is located midway between respective center points $C_l$ and $C_r$ of scanning ball lens assemblies 100l and 100r. Such an aspherical design could be toroidal and would be monocentric with respect to an axis E passing through points $C_m$ and $C_m'$. In cross-section, curved mirror 24 fabricated in this manner would be elliptical, with points $C_m$ and $C_m'$ serving as foci of the ellipse.

Figure 10:
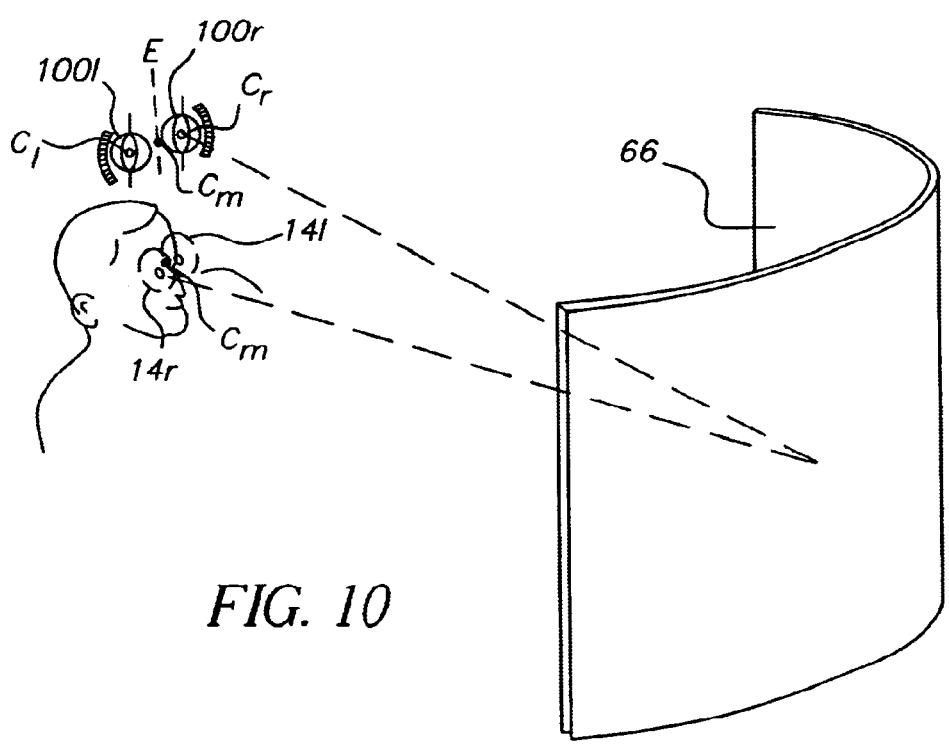
FIG. 10 is a perspective view showing key components of the apparatus of the present invention for another alternate embodiment autostereoscopic imaging system using a Fresnel mirror and essentially paraxial optics.

Referring to FIG. 10, there is shown yet another alternate arrangement, also without beamsplitter 16, similar to that shown in FIG. 9. In FIG. 10, curved mirror 24 is a cylindrically curved, reflective Fresnel mirror 66. The arrangement of components shown in FIG. 10 is monocentric with respect to axis E, as was shown in FIG. 9. Reflective Fresnel mirror 66 has power in only one direction. Reflective Fresnel mirror 66 can be, for example, a planar element fabricated on a flexible substrate, similar to Fresnel optical components manufactured by Fresnel Optics, Rochester, N.Y. Fresnel mirror 66 could be curved into a generally cylindrical shape about axis E, as is shown in FIG. 9. Optionally, Fresnel mirror 66 could be essentially flat. Fresnel mirror 66 would image the exit pupils of scanning ball lens assemblies 100l, 100r onto viewing pupils 14l, 14r in a similar manner to that described above for curved mirror 24.

As yet another option, curved mirror 24 could be replaced using a retroreflective surface, such a surface having an essentially spherical shape with center of curvature coincident with that of scanning ball lens assembly 100. A retroreflective surface would not introduce the image-crossing effect caused by curved mirror reflection. It must be noted, however, that this alternate arrangement would provide a real image, not the virtual image formed by autostereoscopic imaging system 10 in the preferred embodiment.

Optional Embodiment for Scanning Ball Lens Assembly 100

Figure 11:
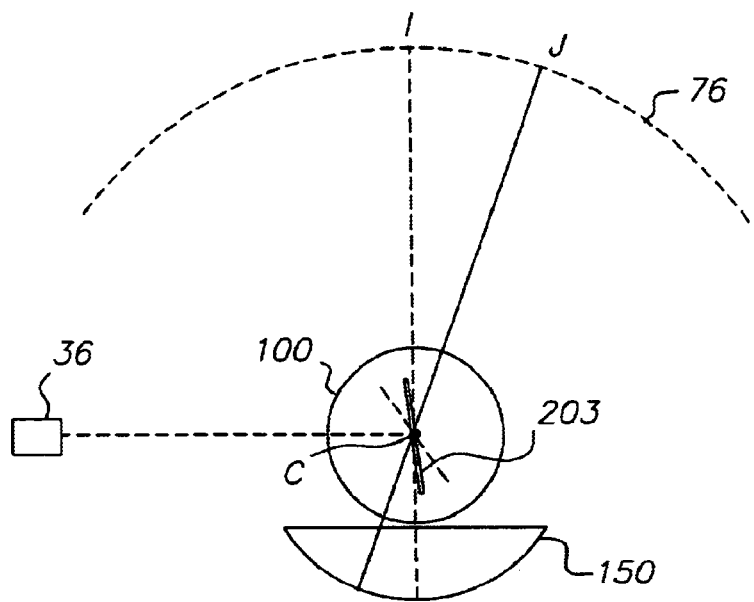
FIG. 11 is a schematic view showing an alternate embodiment in which scanning ball lens assembly is provided with a beamsplitter surface.

Referring to FIG. 11, there is shown an optional embodiment of the present invention, in which a beamsplitter surface 203, partially reflective, is provided in place of reflective surface 102 within scanning ball lens assembly 100. With this construction, scanning ball lens assembly 100 effectively acts as a refractive, rotating beamsplitter. Light from line of source pixels 36 reflects from beamsplitter surface 203 onto a spherical mirror 150 and is transmitted through beamsplitter surface 203 to form intermediate image 76. FIG. 11 shows one possible scan path, with scanning ball lens assembly 100 rotating in a clockwise direction, tracing out lines of intermediate image 76 from initial position I to subsequent position J. With this arrangement, curved line of source pixels 36 is conjugate to the surface of spherical mirror 150. Spherical mirror 150 can provide a substantially spherical surface, with its center of curvature coincident with center C of scanning ball lens assembly 100.

The alternate arrangement of optical components shown in FIG. 11 offers an additional, practical design advantage. Magnification between the conjugate surfaces of line of source pixels 36 and spherical mirror 150 allows line of source pixels 36 to be larger than is feasible with other embodiments, alleviating size constraints and lowering the cost of generating line of source pixels 36.

Eye-sequential Embodiment

Figure 12:
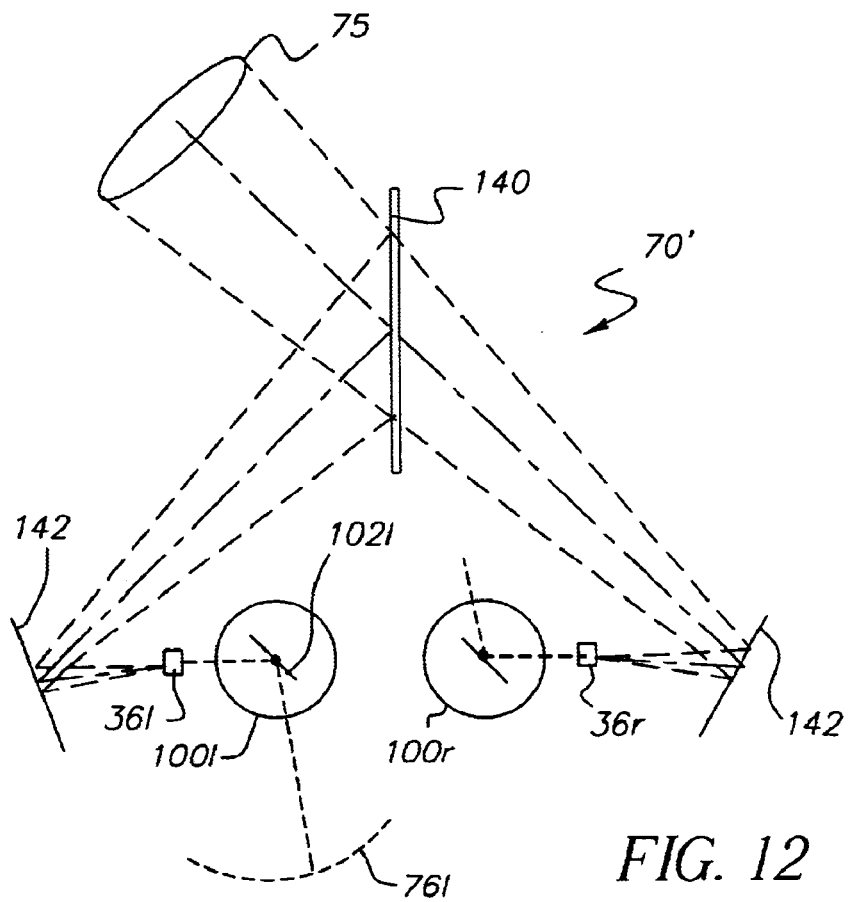
FIG. 12 is a schematic view showing an arrangement of components that sequentially scans generated images for separate left- and right-eye views.

An alternate embodiment of autostereoscopic imaging system 10 takes advantage of the speed of electromechanical grating light modulators 85 to utilize a single modified image generation system 70' to provide both left- and right-eye images. Using the component arrangement shown in FIG. 12, modified image generation system 70' cycles rapidly, forming left intermediate image 76l and right intermediate image 76r in rapid succession, at a high enough rate to give the appearance of continuous image projection. Referring to FIG. 12, modified image generation system 70' comprises both left and right scanning ball lens assemblies 100l and 100r with a beamsplitter 140 and mirrors 142. The upstream image-forming components that provide the image to lens 75 are the same as those shown in FIG. 8b. Not shown are the various timing and synchronization and image data path logic components needed to coordinate loading of the proper image data synchronized with the rotation of left and right scanning ball lens assemblies 100l and 100r.

As has been noted above, there is some "dead time" during the rotation of scanning ball lens assembly 100, during which reflective surface 102 is not at a suitable angle for forming intermediate image 76. Looking ahead to FIG. 13, the arrangement of FIG. 12 synchronizes the dead time for both scanning ball lens assemblies 100 so that left intermediate 76l is formed using left scanning ball lens assembly 100l during the dead time for right scanning ball lens assembly 100r. Correspondingly, right intermediate image 76r is formed using right scanning ball lens assembly 100r during the dead time for left scanning ball lens assembly 100l. With this arrangement, there may be no need to shutter between projection of left and right intermediate images 76l and 76r.

Figure 13:
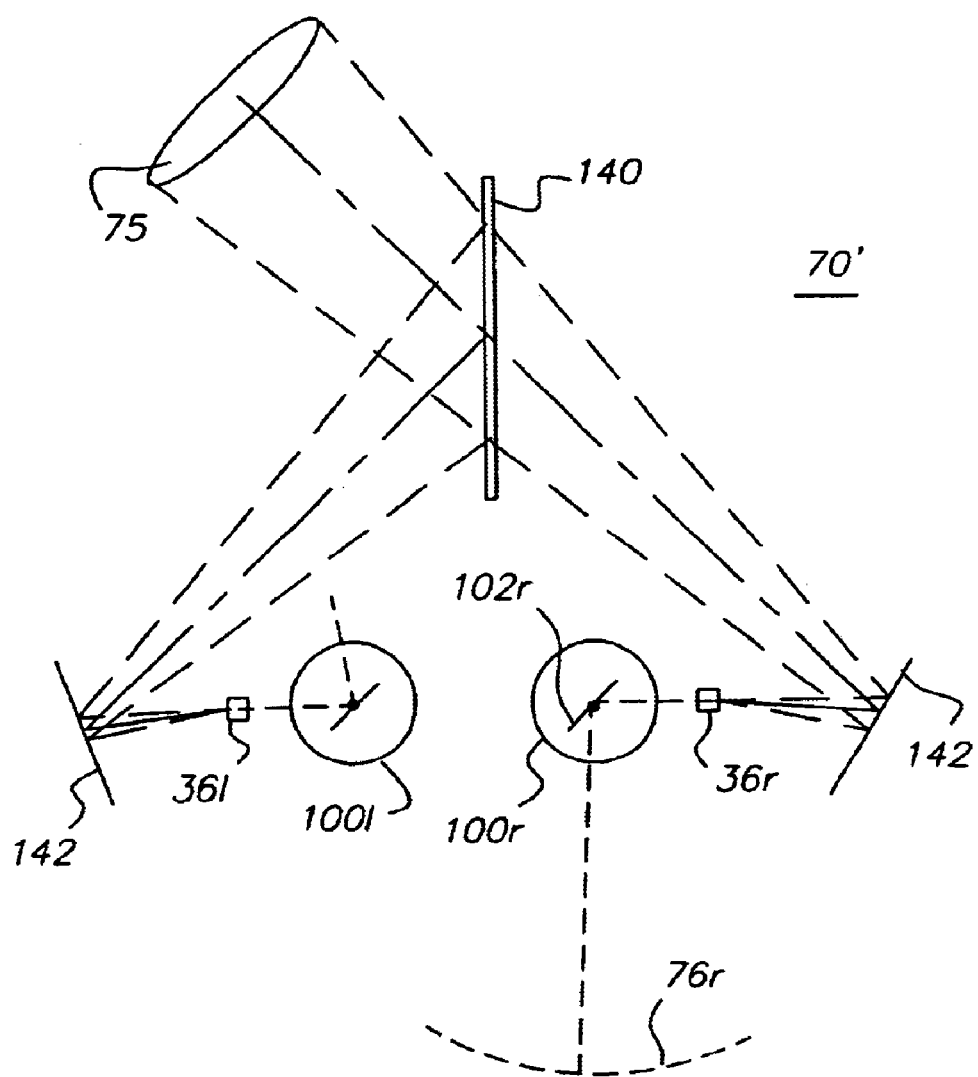
FIG. 13 is a schematic view showing sequential generation of right-eye images using the arrangement of FIG. 12.

Referring to FIG. 12, the image path for modulated light is as follows. Lens 75 directs modulated light toward a beamsplitter 140 which splits the light evenly into left and right imaging paths. In each path, a mirror 142 then directs modulated light onto diffusive surface 30 to form left and right line of source pixels 36l and 36r, respectively. Left intermediate image 76l is formed in an arc as shown when left scanning ball lens assembly 100l scans at the appropriate angles. Moments later, as shown in FIG. 13, right intermediate image 76r is formed by right scanning ball lens assembly 100r. Using this configuration, the same image is directed to both scanning ball lens assemblies 100l and 100r. Each individual scanning ball lens assembly 100 alternately forms its respective intermediate image 76 or effectively deflects the unwanted modulated light during its alternating dead time interval. In a preferred embodiment, the rotation angles of scanning ball lens assemblies 100l and 100r are aligned in order to maintain their respective reflective surfaces 102l and 102r in substantially parallel planes during rotation. Other arrangements are possible.

Figure 14:
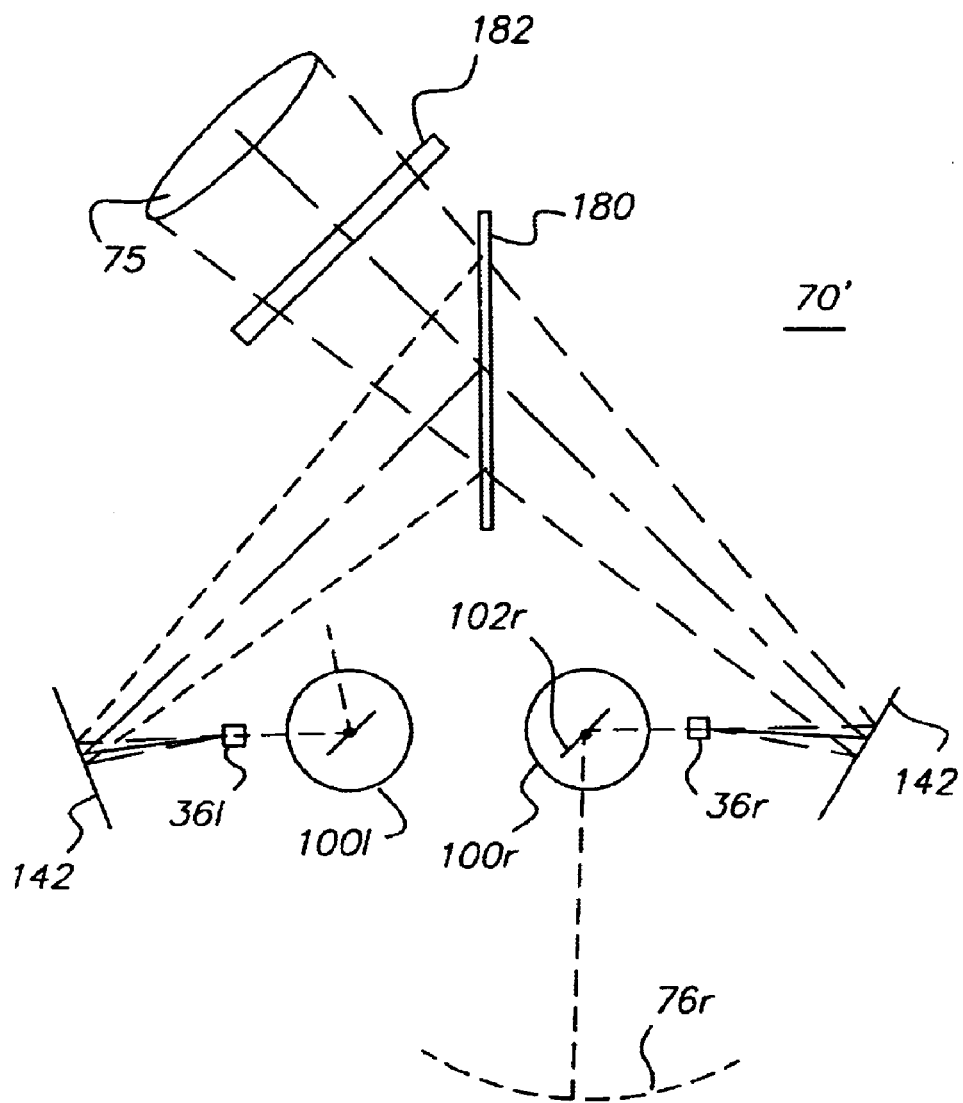
FIG. 14 is a schematic view showing an alternate embodiment for sequential generation of left- and right-eye images.

Although beamsplitter 140 provides a simple and inexpensive approach for splitting light from lens 75 into separate left- and right-eye paths, the arrangement of FIGS. 12 and 13 wastes half of the available light. There would be advantages in switching light so that the full beam of light from lens 75 is used for forming an image using left or right line of source pixels 36l or 36r for each left- and right-eye image respectively. Methods for switching light that are widely used in the optical arts include mechanical manipulation of mirrored surfaces for example. Referring to FIG. 14, there is shown another alternate arrangement of modified image generation system 70' in which all of the light from lens 75 is successively switched between left- and right-eye paths. A liquid crystal shutter 182 operates by rotating the polarization of incident light from lens 75. A polarizing beamsplitter 180 transmits light having one polarization and reflects light having the opposite polarization state. By switching the incident light from lens 75 between polarization states, liquid crystal shutter 182 thus effectively directs the light to either left or right line of source pixels 36l or 36r, in synchronization with the rotation of left and right scanning ball lens assemblies 100l and 100r. Similarly, liquid crystal shutter 182 could be replaced by a rotating waveplate for successively switching the polarization state. It must be noted that methods that switch polarization state, as described with reference to FIG. 14, would require that the light for each color emerging from lens 75 have the same polarization state. This may not be easy to achieve with some conventional types of color-combining components. However, using methods well known in the optical design arts, a multi-order waveplate can be employed to selectively rotate polarization states of different colors. With reference to FIG. 14, one method for selectively changing polarization state would use an appropriately designed multi-order waveplate disposed between lens 75 and liquid crystal shutter 182.

Figure 15A:
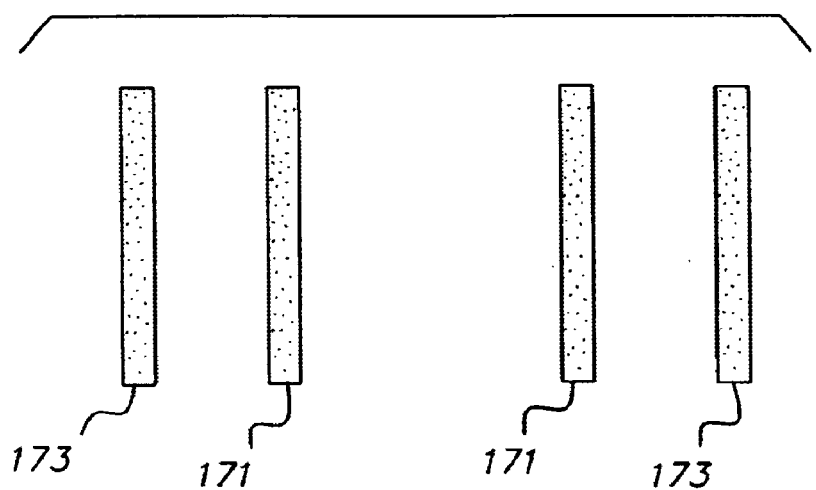
FIGS. 15a–15c are plane views showing the action of a patterned mirror used in an optional embodiment.
Figure 15B:
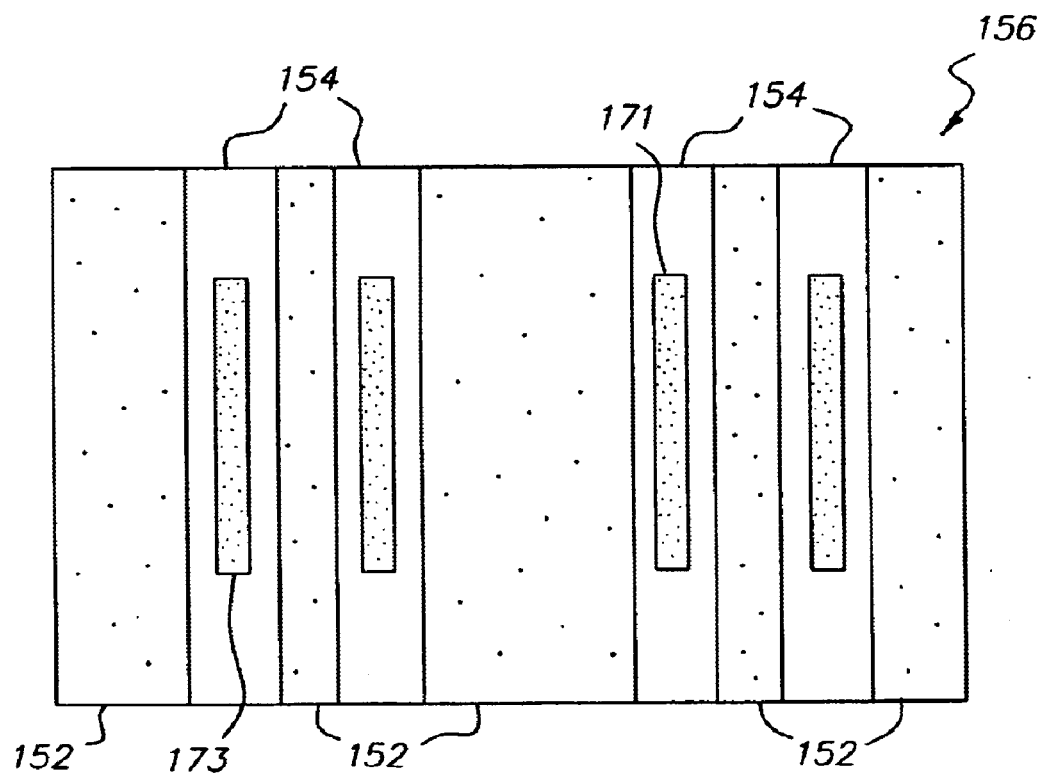
Figure 15C:
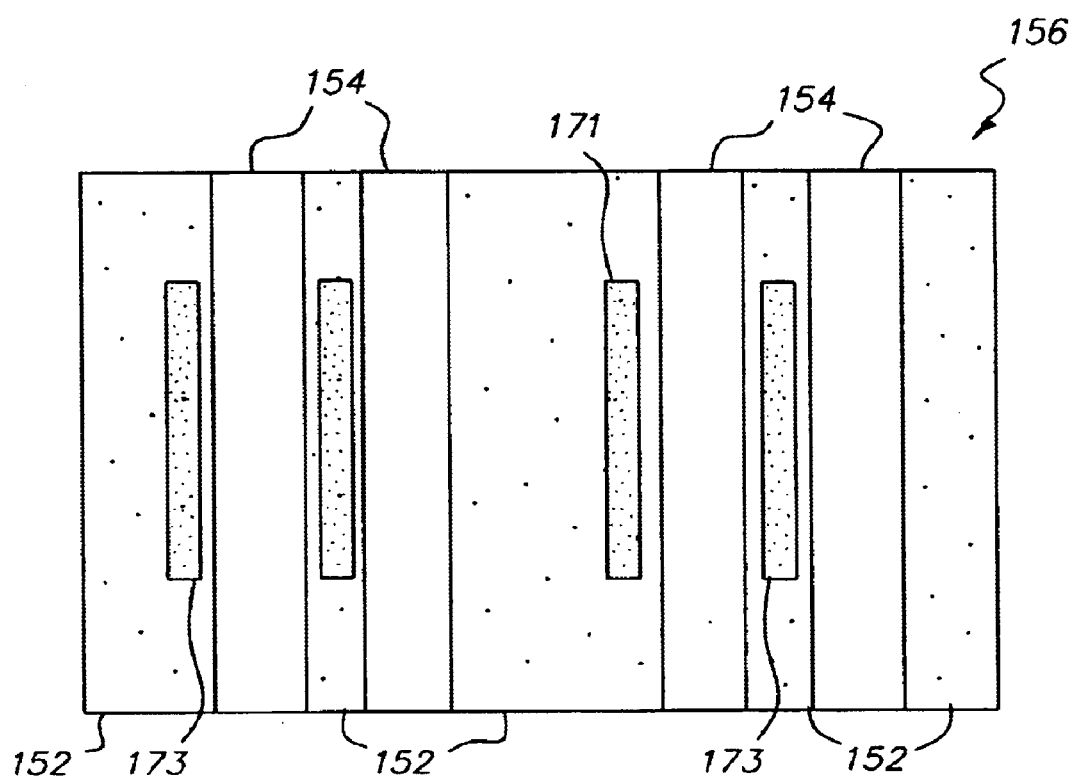

Referring to FIGS. 15b and 15c, yet another alternative method for switching light uses a patterned mirror 156. This method takes advantage of the spatial pattern of light modulated from electromechanical grating light modulator 85. As FIG. 15a shows, and as is described in more detail in U.S. patent application Ser. No. 09/671,040 mentioned above, this pattern essentially comprises a first diffraction order 171 and a second diffraction order 173. As FIG. 15b shows, patterned mirror 156 comprises reflective portions 152 and transmissive portions 154, dimensioned to correspond to the spatial positions of first diffraction order 171 and second diffraction order 173. In one position of patterned mirror 156, as shown in FIG. 15b, transmissive portions 154 are aligned to allow transmission of first and second diffraction orders 171 and 173. Then, with a lateral translation of patterned mirror 156, as shown in FIG. 15c, reflective portions 152 are aligned so that first and second diffraction orders 171 and 173, represented in outline in FIG. 15c, are reflected. By reciprocating between the positions represented in FIGS. 15b and 15c, patterned mirror 156 forms an optical switch, which could be substituted in the position of beamsplitter 140 in FIG. 12 to alternately direct all of the light from lens 75 to left and right line of source pixels 36l and 36r.

It can be appreciated that the arrangements of FIGS. 12, 13, and 14 have cost advantages, since the same image-modulating and conditioning components serve both left and right image paths. It is important to emphasize that the arrangement of optical components shown in FIGS. 12, 13, and 14 can be used with other types of linear image modulators in addition to electromechanical grating devices. For example, the approach shown in FIGS. 12, 13 and 14 could be used with a resonant fiber, scanned laser or other point source, or linear LED array as is described in copending U.S. patent application Ser. Nos. 10/010,500 and 10/095,341. A single linear image modulation component can thereby serve to provide both left and right intermediate images 76 with this arrangement.

Arrangements Using Four or More Colors

Figure 16:
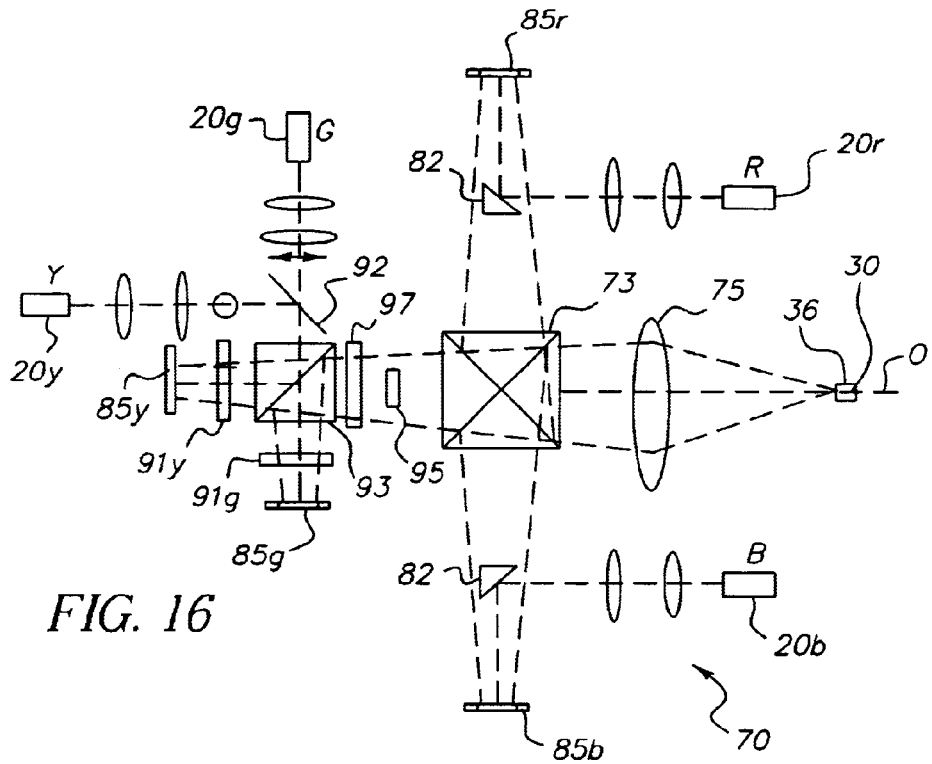
FIG. 16 is a schematic view showing one arrangement for a four-color image generation system.

Referring to FIG. 16, there is shown an arrangement for color generating components of four-color image generation system 70 as a multicolor linear modulator in a preferred embodiment. As was shown with respect to FIG. 8b, components specific to each color path may be labeled with an appended letter where r, g, and b represent conventional red, green, and blue colors and y represents a fourth color, which may be yellow, yellow-green, blue-green, or other color selection that is suitable for color gamut expansion. In separate red and blue color modulation paths, light sources 20r and 20b are directed toward their respective electromechanical grating light modulators 85r and 85b by turning mirrors 82 that also function as stops for zero order reflection. Modulated red and blue light is then combined by color combining cube 73 onto a common axis O for projection in order to form line of source pixels 36. The green and yellow color modulation paths are handled and combined in a different way, using a polarizing beamsplitter 93. Green light source 20g and yellow light source 20y are directed toward polarizing beamsplitter 93 by means of a dichroic combiner 92. Polarizing beamsplitter 93 transmits p-polarized light and reflects s-polarized light. The green light, having p-polarization as indicated by the double-arrow symbol, is transmitted through polarization beamsplitter 93 and through a retarder 91g to electromechanical grating light modulator 85g. Modulated green light from electromechanical grating light modulator 85g, having s-polarization after passing again through retarder 91g, is then reflected from polarizing beamsplitter 93, which directs the modulated light through color combining cube 73. The yellow light is first reflected at dichroic combiner 92 and directed to polarizing beamsplitter 93. The yellow light, having s-polarization, is reflected from polarizing beamsplitter 93, transmitted through retarder 91y and modulated by yellow electromechanical grating light modulator 85y. Modulated yellow light again passes through retarder 91y and is transmitted through polarizing beamsplitter 93 and to color combining cube 73.

Retarders 91g and 91y, preferably quarter-wave retarders, rotate the polarization of incident (incoming) and of modulated (outgoing) green and yellow light, respectively. As a result, the modulated yellow light, transmitted through polarizing beamsplitter 93, is directed onto common axis O by color combining cube 73. A multiorder waveplate 97 corrects the polarization of modulated light that emerges from polarizing beamsplitter 93 so that both the modulated green and yellow light have the required polarization state for obtaining efficient handling by color combining cube 73. Color combining cube 73 then directs all of the modulated light beams along a common axis O for forming line of source pixels 36 onto diffusive surface 30.

The arrangement given in FIG. 16 utilizes four electromechanical grating light modulators 85, each of which, dedicated to use with a single color, can operate at the same time. Stop 95 blocks zero-order reflection for a color path that combines two or more colors. In its simplest form, stop 95 would not be reflective.

Figure 17:
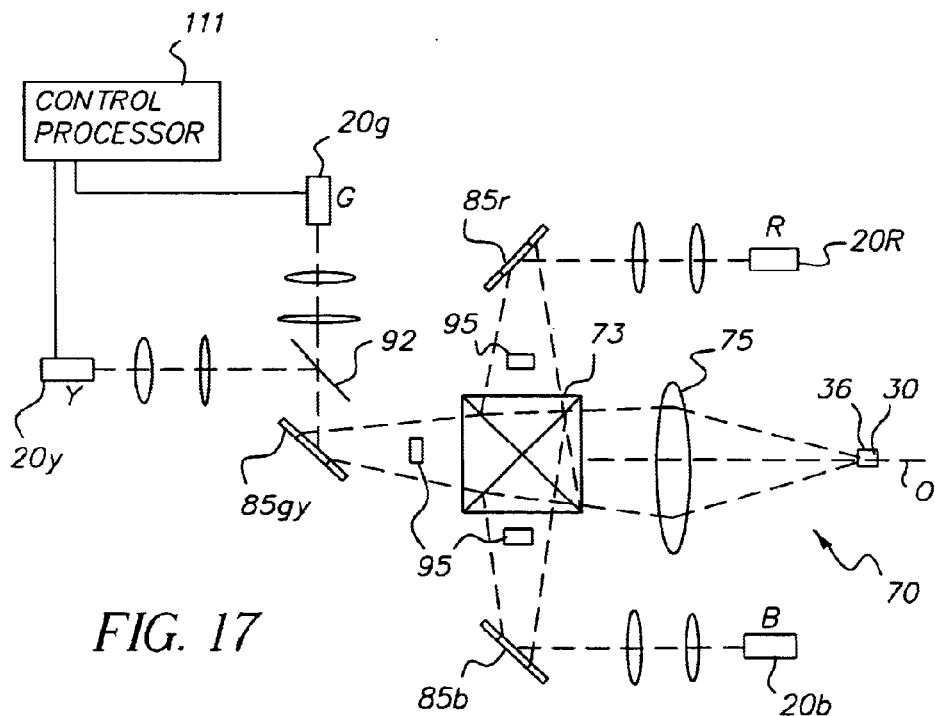
FIG. 17 is a schematic view showing an alternate arrangement for a four-color image generation system using three light modulators.

It can be appreciated that there can be advantages to reducing the complexity and cost of image generation system 70 without compromising image quality. Referring to FIG. 17, there is shown an alternate four-color image generation system 70 that reduces cost by using only three electromechanical grating light modulators 85. Disposed diagonally with respect to the surfaces of color combining cube 73, the three electromechanical grating light modulators 85 do not require turning mirrors 82; only stops 95 are required to block zero-order reflection. Electromechanical grating light modulators 85r and 85b modulate red and blue color light from light sources 20r and 20b respectively and direct the modulated light, as diffracted orders, to color combining cube 73. In turn, color combining cube 73 directs modulated red and blue light onto common axis O for projection to form line of source pixels 36 on diffusive surface 30. Yellow and green color modulation, however, is handled differently. Electromechanical grating light modulator 85gy receives incident green light from light source 20g that is transmitted through dichroic combiner 92. Alternately, yellow light from light source 20y is reflected from dichroic combiner 92 and onto electromechanical grating light modulator 85gy. Since electromechanical grating light modulator 85gy can modulate only one color at a time, a control processor 111 is provided to alternately illuminate light source 20y and 20g for successive modulation of both colors, at a rate that is not perceivable to a human observer, such as 60 Hz, for example. Where light sources 20g and 20y are lasers, control processor 111 may be able to control illumination at a fast enough rate for this multiplexing activity by directly cycling laser power. Optionally, shutters (not shown) could be employed in the illumination path for this purpose.

Still referring to FIG. 17, it must be noted that it would be possible, by duplicating the pattern shown for yellow and green color paths, to further reduce cost such that only two electromechanical grating light modulators 85 would be needed for four colors. That is, red and blue light sources 20r and 20b could also be directed to a separate dichroic combiner 92 and a single electromechanical grating light modulator 85 for red and blue light could be controlled by control processor 111 to form a multiplexed color image that would then be directed to color combiner 73.

With the overall arrangement of FIG. 17, techniques for separating light using polarization could be employed, similar to those described with respect to FIG. 16, so that a polarizing beamsplitter 93 could be substituted for dichroic combiner 92. Again, however, this would require the use of a multiorder retarder, so that, where two different colors are modulated by the same electromechanical grating light modulator 85, each modulated color has a suitable polarization state.

It is recognized that, when using color-multiplexed linear modulators, there can be unintended imaging anomalies that occur due to slight misalignment of individual color lines as two-dimensional images are formed. Techniques to compensate for slight misalignment include periodically changing the sequencing of colors that share the same linear modulator device.

Figure 18:
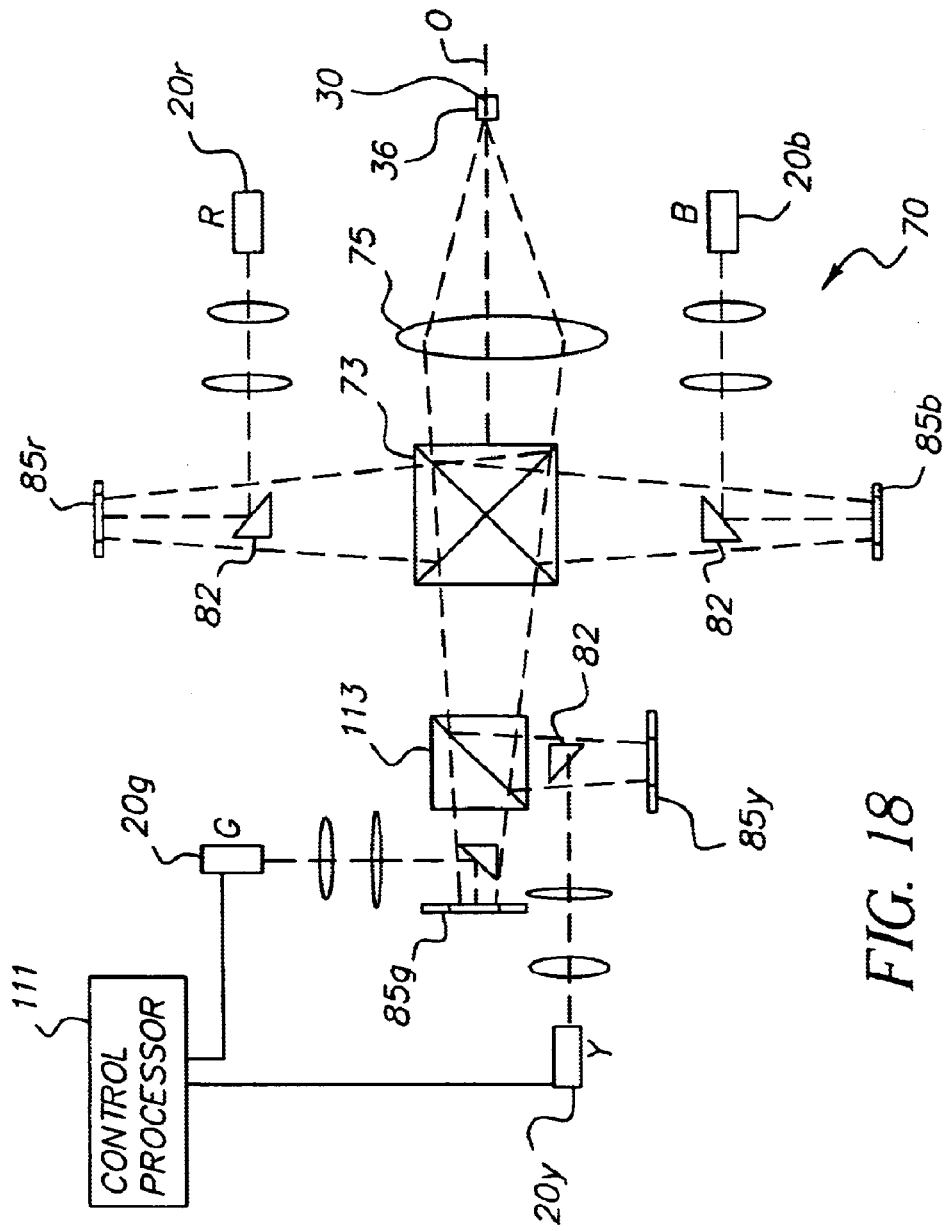
FIG. 18 is a schematic view showing an alternate arrangement for a four-color image generation system, with a turning mirror in each color modulation path.

Referring to FIG. 18, there is shown another alternate arrangement for four-color image generation system 70. Here, a dichroic combiner 113 is used for combining the green and yellow color modulation paths for color combining cube 73. A separate electromechanical grating light modulator 85 is used for each component color.

Figure 19:
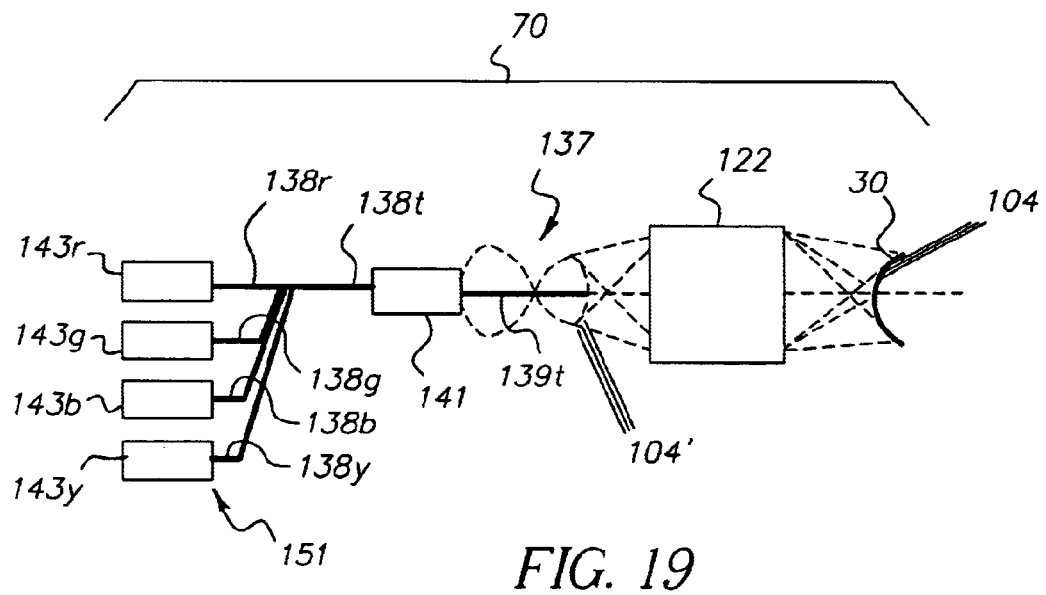
FIG. 19 is a block diagram view showing a four-color image generation system using a resonating optical fiber.
Figure 20:
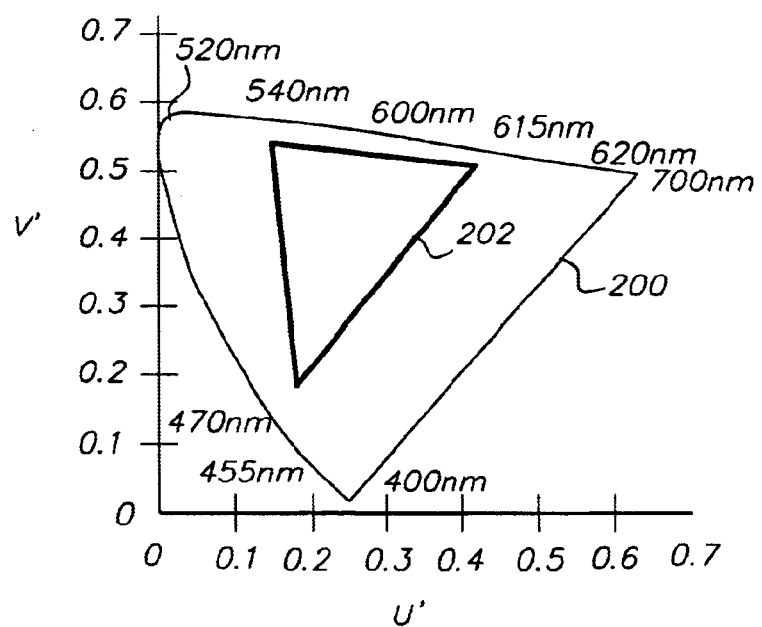
FIG. 20 is a graph showing a typical color space defined with three component colors.
Figure 21:
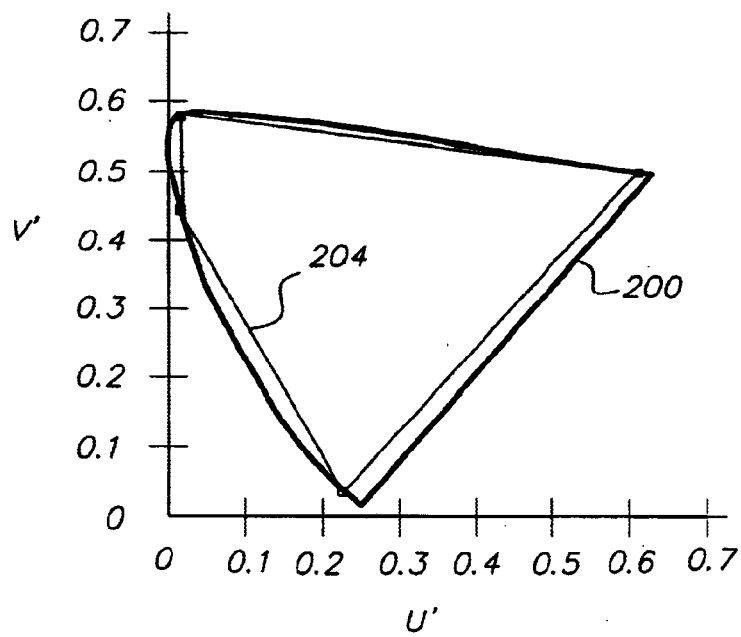
FIG. 21 is a graph showing a color space defined using four component colors.

Referring to FIG. 19, there is shown an alternate arrangement for four-color image generation system 70 as a multicolor linear modulator using a resonant fiber scanner 137. In resonant fiber optic scanning, as is described in the article entitled "Single Fiber Endoscope: General Design for Small Size, High Resolution, and Wide Field of View" in *Proceedings of SPIE,* Vol. 4158 (2001) pp. 29–39, by Eric J Seibel, Quinn Y. J. Smithwick, Chris M. Brown, and Per G. Reinhall, a fiber optic element is actuated at resonant frequency and thereby controllably scanned over a small area in a regular pattern, such as a linear raster pattern, for example. Commonly-assigned copending U.S. patent application Ser. No. 10/095,341 discloses use of resonant fiber scanning for forming a three-color image in an autostereoscopic display. Referring to FIG. 19, a red light source 143r, a green light source 143g, a blue light source 143b, and a yellow light source 143y are provided, each directing its light into a corresponding red, green, blue, or yellow optical fiber 138r, 138g, 138b, 138y. Acting as light guides, optical fibers 138r, 138g, 138b, and 138y direct and combine the light to a multicolor optical fiber 138t, thereby forming a multi-furcated fiber assembly 151. An actuator 141 actuates a multicolor resonant cantilever portion 139t to form effective source pixels 104'. A lens assembly 122 then projects the scanned image formed thereby onto diffusive surface 30 to form source pixels 104.

The scan pattern traced out onto diffusive surface 30 by resonant fiber scanner 137 could form line of source pixels 36 for scanning by scanning ball lens assembly 100. Alternately, resonant fiber scanner 137 could trace out a raster scan pattern, thereby generating a two-dimensional image onto diffusive surface 30, as is disclosed in commonly-assigned copending U.S. patent application Ser. No. 10/095,341. Where a two-dimensional image is formed on diffusive surface 30, scanning ball lens assembly 100 can be replaced by a stationary ball lens assembly, as disclosed in U.S. patent application Ser. No. 10/095,341.

Further Techniques for Combining Light Sources

Figure 24:
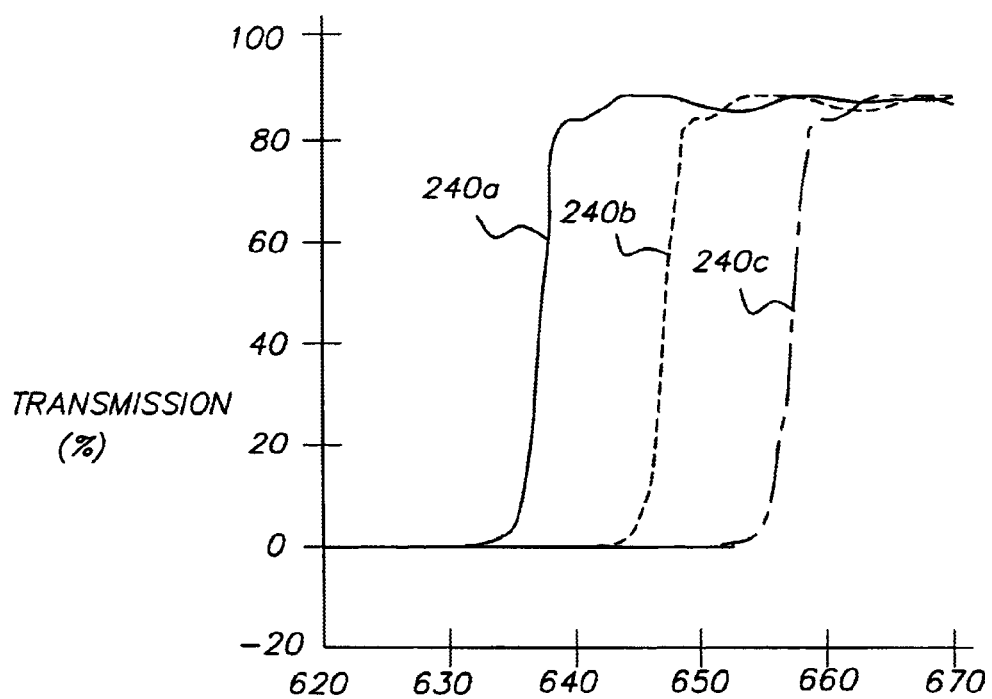
FIG. 24 is a graph showing typical characteristic curves for color filters over a narrow range of wavelengths.
Figure 22:
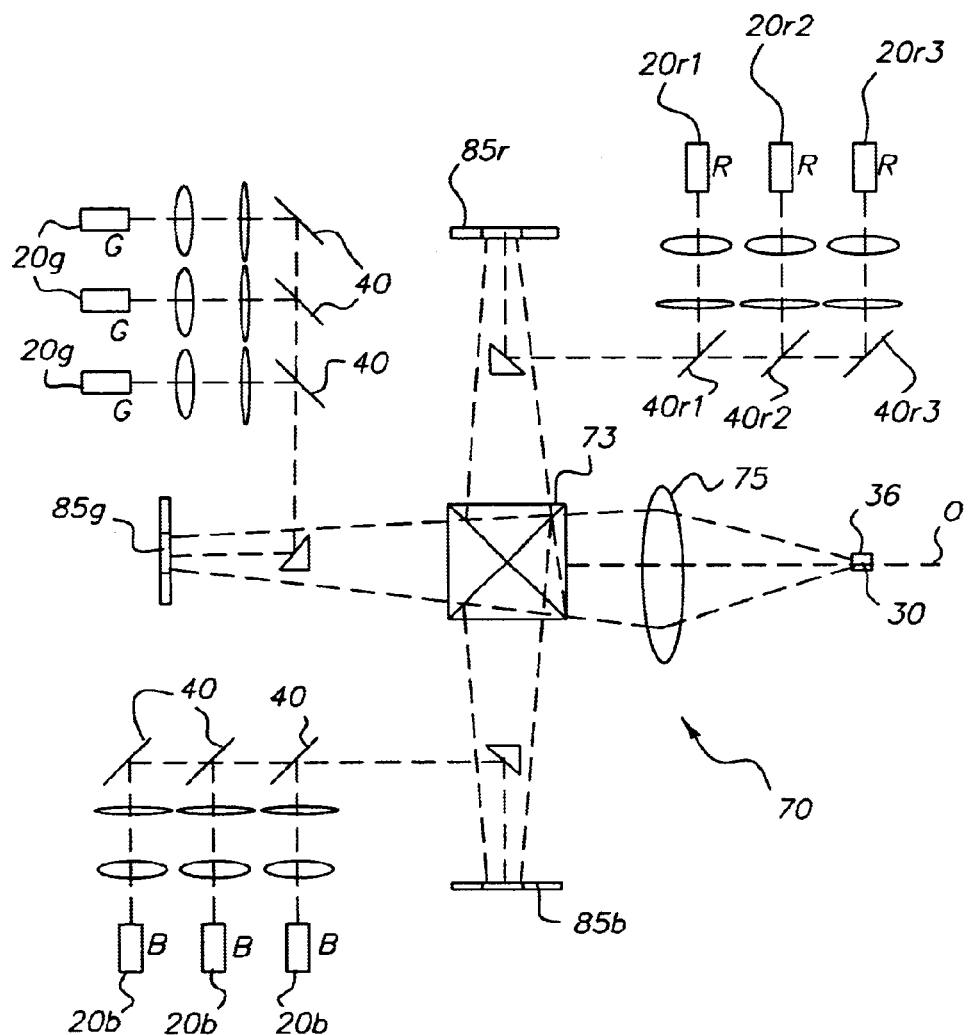
FIG. 22 is a schematic view showing an arrangement using multiple colored light sources combined within each of three component color paths.

It is known that laser power can be boosted by combining one or more laser beams onto a single light path. Referring to FIG. 22, image generation system 70 has red, green, and blue electromechanical grating light modulators 85r, 85g, and 85b. Referring specifically to the red path, multiple red light sources 20r1, 20r2, and 20r3 are provided. Dichroic filters 40r1, 40r2, and 40r3 are used to combine the light from multiple red light sources 20r1, 20r2, and 20r3 onto a single path for modulation by electromechanical grating light modulator 85r. In order to provide this function, it is necessary to match the output wavelengths of individual light sources 20r1, 20r2, and 20r3 with the filter characteristics of corresponding dichroic filters 40r1, 40r2, and 40r3. Referring to FIG. 24, there is shown a series of representative response curves 240a, 240b, and 240c for dichroic filters 40r1, 40r2, and 40r3 respectively. Curves 240a, 240b, and 240c plot filter transmission, as a percentage, against wavelength. Using this principle, as shown in FIG. 22, dichroic filter 40r1 reflects light from light source 20r1 and transmits light from light sources 20r2 and 20r3. Similarly, dichroic filter 40r2 reflects light from light source 20r2 and transmits light from light source 20r3. Dichroic filter 40r3 reflects light from light source 20r3 and could be designed to transmit light from one or more additional sources 20. Where light source 20r3 is the last in the series, a mirror could be substituted for dichroic filter 40r3 or light source 20r3 could be positioned to transmit directly through dichroic filter 40r2. This pattern requires that light sources 20r1, 20r2, and 20r3 be sorted according to their different wavelengths, varying from each other significantly enough to allow selective reflectance and transmission by dichroic filters 40r1, 40r2, and 40r3. Referring back to the example graph of FIG. 24, dichroic filter 40r1, matched to the output wavelength of light source 20r1, has the transmission response of curve 240a. This allows dichroic filter 40r1 to transmit red wavelengths of about 638 nm and higher with at least 80% efficiency. Dichroic filter 40r2, matched to the output wavelength of light source 20r2, has the transmission response of curve 240b. This allows dichroic filter 40r2 to transmit red wavelengths of about 648 nm and higher with at least 80% efficiency. Similarly, dichroic filter 40r2, matched to the output wavelength of light source 20r2 and with the transmission response of curve 240b, transmits red wavelengths of about 658 nm and higher with at least 80% efficiency. Using this pattern, the dichroic filter 40r1 having the lowest wavelength response passes all higher wavelengths; each succeeding dichroic filter 40 may be more restrictive.

Figure 23:
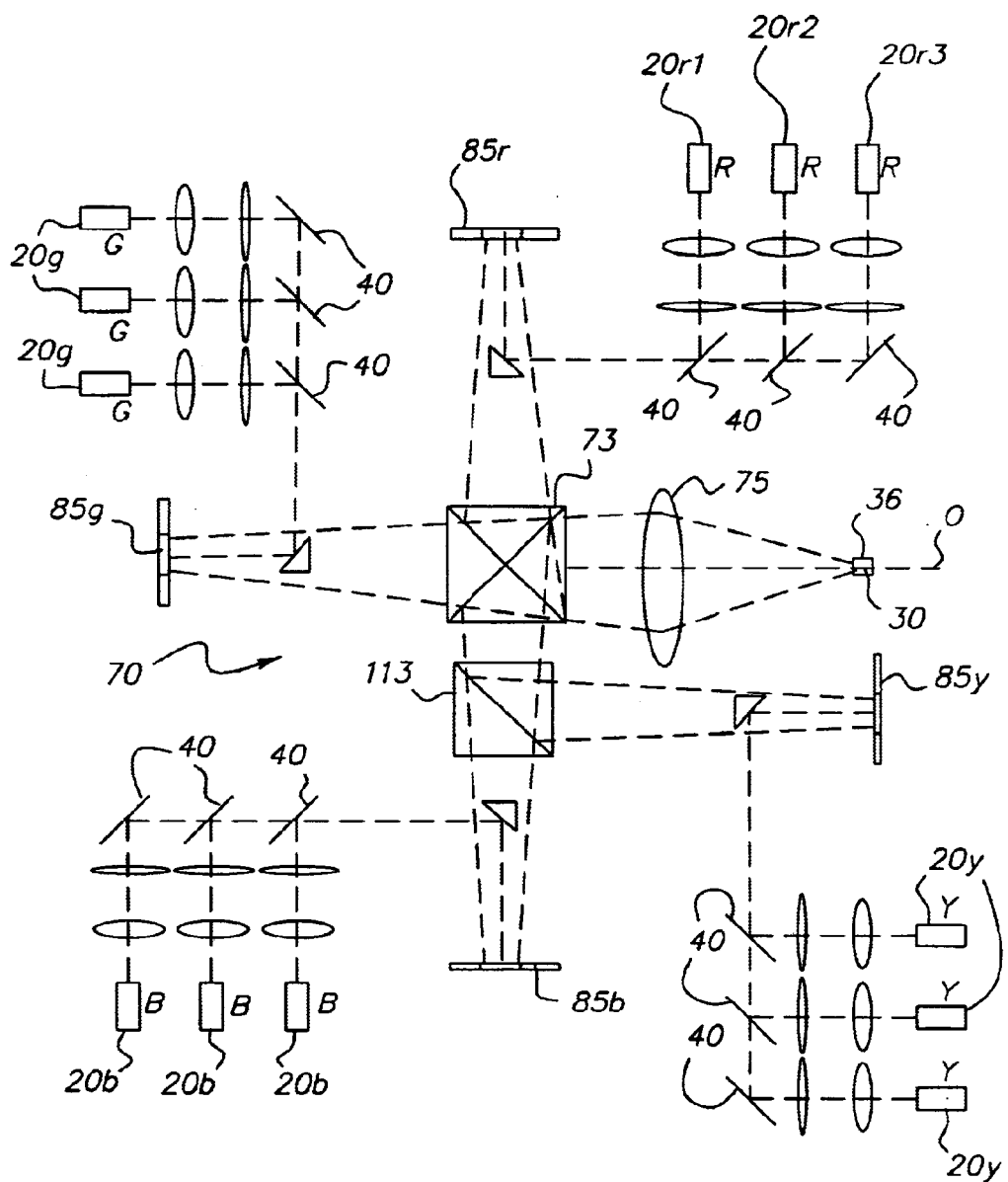
FIG. 23 is a schematic view showing an arrangement using four colored light sources combined within each of three component color paths.

Referring to FIG. 23, there is shown an extension of the ganged light source design shown with reference to FIG. 22. Here, four different composite color paths are provided, with dichroic mirrors 40 guiding the light of each color for delivery to electromechanical grating light modulator 85.

The component arrangements of FIGS. 22 and 23 allow additional brightness to be selectively added within each color path. However, while this solution may increase brightness, there is necessarily some loss of color gamut, since spectral purity of the composite colors is diminished.

The role of control processor 111, shown in FIGS. 17 and 18, could be expanded for directing the operation of light sources 20r, 20g, 20b, and 20y in a number of ways. Certainly, control processor 111 can control the sequencing of two separate light sources 20 that are directed to the same electromechanical grating light modulator 85, as was described with respect to FIGS. 17 and 18. In addition, control processor 111 may be programmed to select or inhibit the display of any color as desired, in order to optimize the viewing experience. Some types of scene content, for example, may benefit from being produced using only three colors, for example.

It must be pointed out that FIGS. 16, 17, 18, 19, 22, and 23 show only the components of image generation system 70 that are used for color modulation. The mechanics of scanning optics for projecting line of source pixels 36 are similar to those described above with reference to FIG. 8b.

FIGS. 16, 17, 18, 19, and 23 show a preferred selection of colors that allow a broad color gamut: red, green, blue, and yellow. However, it must be emphasized that a different selection of colors might be appropriate for specific types of images or viewing conditions, within the scope of the present invention.

The optical switch arrangement shown in modified image generation system 70' of FIGS. 12, 13, and 14 could be used for a system using any number of color light sources 20. Recall from the above description that this allows a single image generation system 70' to provide both left- and right-eye images.

The preferred embodiment of the present invention provides an expanded color gamut, an exceptionally wide field of view and the required brightness for stereoscoping imaging in excess of the 90-degree range, with viewing pupil 14 size near 20 mm. Moreover, scanning ball lens assembly 100 provides excellent off-axis performance and allows a wider field of view, possibly up to 180 degrees. This provides an enhanced viewing experience for observer 12, without requiring that headset, goggles, or other device be worn.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, there are many possible arrangements for supporting projection optics, for color multiplexing and sequencing, and for mirror surfaces that could be used with the monocentric arrangement of components disclosed for this invention.

The various methods disclosed herein for combining colors could be employed using a variety of spatial light modulators. For example, reflective and transmissive liquid crystal devices (LCDs) could be used as image modulators. Other types of image modulators, such as digital micromirror devices (DMDs) could alternately be used for forming images, within the scope of the present invention. Although not yet commercially available in four-color versions, LED arrays and OLEDs promise to provide yet another alternative image-forming device, with the advantages that these devices modulate the emitted light directly and provide a diffusive surface for forming the intermediate image. Methods for combining additional colors using two-dimensional spatial light modulators would parallel those described for the linear modulators described in this application. With respect to autostereoscopic display apparatus using two-dimensional spatial light modulators, reference is made to commonly-assigned copending U.S. patent application Ser. No. 09/738,747.

Thus, what is provided is a monocentric optical apparatus for autostereoscopic display with a very wide field of view and large viewing pupils and having an expanded color gamut.

PARTS LIST

| | |
|---|---|
| 10 | Autostereoscopic imaging system |
| 12 | Observer |
| 14 | Viewing pupil |
| 14l | Left viewing pupil |
| 14r | Right viewing pupil |
| 16 | Beamsplitter |
| 20 | Light source |
| 20g | Green light source |
| 20b | Blue light source |
| 20y | Yellow light source |
| 20r | Red light source |
| 20r1 | Red light source |
| 20r2 | Red light source |
| 20r3 | Red light source |
| 22 | Focal surface |
| 24 | Curved mirror |
| 25 | Optical axis |
| 30 | Diffusive surface |
| 32 | Motor |
| 36 | Line of source pixels |
| 36l | Left line of source pixels |
| 36r | Right line of source pixels |
| 40 | Dichroic filters |
| 40r1 | Dichroic filters |
| 40r2 | Dichroic filters |
| 40r3 | Dichroic filters |
| 42 | Meniscus lens |
| 44 | Meniscus lens |
| 46 | Spherical lens |
| 48 | Stop |
| 52 | Intermediate line image |
| 52' | Intermediate line image |
| 66 | Fresnel mirror |
| 68 | Human eye pupil |
| 68l | Left human eye pupil |
| 68r | Right human eye pupil |
| 70 | Image generation system |
| 70l | Left image generation system |
| 70r | Right image generation system |
| 70' | Modified image generation system |
| 72 | Spherical lens |
| 73 | Color combining cube |
| 74 | Cylindrical lens |
| 75 | Lens |
| 76 | Intermediate image |
| 76l | Left intermediate image |
| 76r | Right intermediate image |
| 82 | Turning mirror |
| 83 | Mirror |
| 85 | Electromechanical grating light modulator |
| 85r | Electromechanical grating light modulator, red |
| 85g | Electromechanical grating light modulator, green |
| 85b | Electromechanical grating light modulator, blue |
| 85y | Electromechanical grating light modulator, yellow |
| 85gy | Electromechanical grating light modulator, green-yellow |
| 91g | Retarder, green |
| 91y | Retarder, yellow |
| 92 | Dichroic combiner |
| 93 | Polarizing beamsplitter |
| 95 | Stop |

-continued

PARTS LIST

| | |
|---|---|
| 97 | Multiorder waveplate |
| 100 | Scanning ball lens assembly |
| 100l | Left scanning ball lens assembly |
| 100r | Right scanning ball lens assembly |
| 101 | Ball lens pupil |
| 102 | Reflective surface |
| 102l | Left reflective surface |
| 102r | Right reflective surface |
| 104 | Source pixel |
| 104' | Effective source pixel |
| 106 | Virtual image |
| 108 | Image pixel |
| 111 | Control processor |
| 112 | Hemispheric lens segment |
| 113 | Dichroic combiner |
| 122 | Lens assembly |
| 137 | Resonant fiber scanner |
| 138 | Optical fiber |
| 138r | Optical fiber, red |
| 138g | Optical fiber, green |
| 138b | Optical fiber, blue |
| 138y | Optical fiber, yellow |
| 138t | Multicolor optical fiber |
| 139t | Multicolor resonant cantilever portion |
| 140 | Beamsplitter |
| 141 | Actuator |
| 142 | Mirror |
| 143r | Red light source |
| 143g | Green light source |
| 143b | Blue light source |
| 143y | Yellow light source |
| 150 | Spherical mirror |
| 151 | Multifurcated fiber assembly |
| 152 | Reflective portion |
| 154 | Transmissive portion |
| 156 | Patterned mirror |
| 171 | First diffraction order |
| 173 | Second diffraction order |
| 180 | Polarizing beamsplitter |
| 182 | Liquid crystal shutter |
| 200 | Visible gamut |
| 202 | Device gamut |
| 203 | Beamsplitter surface |
| 204 | Expanded device gamut |
| 240a | Curve |
| 240b | Curve |
| 240c | Curve |

What is claimed is:

1. An autostereoscopic optical apparatus for displaying a color stereoscopic image comprising a left image and a right image, the apparatus having an image generation system comprising at least four light sources, each light source having a different color.

2. An auto stereoscopic optical apparatus according to claim 1 wherein said left image is provided at a left viewing pupil and said right image is provided at a right viewing pupil.

3. An autostereoscopic optical apparatus according to claim 1 wherein said image generation system forms, in a repeated sequence, a left source image and a right source image.

4. An autostereoscopic optical apparatus according to claim 1 wherein said image generation system simultaneously forms a left source image and a right source image.

5. An autostereoscopic optical apparatus according to claim 1 wherein said image generation system comprises a linear image modulator.

6. An autostereoscopic optical apparatus according to claim 5 wherein said linear image modulator is selected from the group consisting of resonant optical fiber, electromechanical grating device, conformal grating device, and grating light valve.

7. An autostereoscopic optical apparatus according to claim 1 wherein said image generation system comprises a two-dimensional spatial light modulator.

8. An autostereoscopic optical apparatus according to claim 7 wherein said two-dimensional spatial light modulator is selected from the group consisting of reflective LCD, transmissive LCD, and digital micromirror device.

9. An autostereoscopic optical apparatus according to claim 1 wherein said colors are selected from the group consisting of red, green, blue, blue-green, yellow-green, and yellow.

10. An autostereoscopic optical apparatus for displaying a color stereoscopic image comprising a left image and a right image, the apparatus having an image generation system comprising:
 (a) at least four light sources, each light source having a different color and providing an incident unmodulated beam;
 (b) at least one image modulator for modulating, at any one time, said incident unmodulated beam from at least one of said at least four light sources for forming a modulated source beam;
 (c) a color combiner for directing said modulated source beam onto an optical axis; and
 (d) a lens for directing said modulated source beam from said optical axis toward an image-forming surface.

11. An autostereoscopic optical apparatus according to claim 10 wherein said light sources are from the group consisting of laser, LED, and lamp.

12. An autostereoscopic optical apparatus according to claim 10 wherein said colors are selected from the group consisting of red, green, blue, blue-green, yellow-green, and yellow.

13. An autostereoscopic optical apparatus according to claim 10 wherein said image modulator is selected from the group consisting of reflective LCD spatial light modulator, transmissive LCD spatial light modulator, digital micromirror device, resonant optical fiber, electromechanical grating device, conformal grating device, and grating light valve.

14. An autostereoscopic optical apparatus according to claim 10 wherein said color combiner is selected from the group consisting of X-cube, Philips prism, optical fiber, and dichroic combiner.

15. An autostereoscopic optical apparatus according to claim 10 wherein said image-forming surface provides an intermediate image.

16. An autostereoscopic optical apparatus according to claim 15 wherein said image-forming surface is selected from the group consisting of ground glass, etched glass, ground polymer, etched polymer, a coating, and an optical fiber faceplate.

17. An autostereoscopic optical apparatus according to claim 15 further comprising a projection lens for projecting said intermediate image toward a reflective surface for forming a virtual image.

18. An autostereoscopic optical apparatus according to claim 17 wherein said reflective surface is selected from the group consisting of a mirror, a curved mirror, and a Fresnel mirror.

19. An autostereoscopic optical apparatus according to claim 17 wherein said projection lens comprises a ball lens segment.

20. An autostereoscopic optical apparatus according to claim 19 wherein said projection lens further comprises a rotating mirrored surface.

21. An autostereoscopic optical apparatus according to claim 19 further comprising a beamsplitter for directing the projected intermediate image toward said reflective surface.

22. An autostereoscopic optical apparatus according to claim 15 further comprising a projection lens for projecting said intermediate image toward a display surface to form a real image for viewing.

23. An autostereoscopic optical apparatus according to claim 22 wherein said display surface comprises a retroreflective surface.

24. An autostereoscopic optical apparatus according to claim 10 further comprising a logic controller for controlling at least two of said at least four light sources.

25. An autostereoscopic optical apparatus according to claim 10 further comprising a logic controller for controlling said at least one image modulator.

26. An autostereoscopic optical apparatus according to claim 10 wherein said color combiner further comprises a dichroic combiner for directing at least two of said at least four light sources to a single one of said at least one image modulator.

27. An autostereoscopic optical apparatus for displaying a color stereoscopic image comprising a left image and a right image, the apparatus comprising a left image generation system and a right image generation system wherein both left and right image generation systems are similarly constructed of separate components, with each image generation system comprising:
 (a) an LED array that emits and modulates light as an array of pixels having at least four colors to form a modulated source beam; and
 (b) a projection lens for projecting said modulated source beam toward a reflective image-forming surface.

28. An autostereoscopic optical apparatus according to claim 27 wherein said colors are selected from the group consisting of red, green, blue, blue-green, yellow-green, and yellow.

29. An autostereoscopic optical apparatus according to claim 27 wherein said projection lens comprises a ball lens segment.

30. An autostereoscopic optical apparatus according to claim 27 wherein said reflective image-forming surface forms a final virtual image.

31. An autostereoscopic optical apparatus according to claim 30 wherein said reflective image-forming surface is selected from the group consisting of a mirror, a curved mirror, and a Fresnel mirror.

32. An autostereoscopic optical apparatus according to claim 27 wherein said reflective image-forming surface forms a final real image.

33. An autostereoscopic optical apparatus according to claim 32 wherein said reflective image-forming surface is selected from the group consisting of a retroreflective surface and a display screen.

34. An autostereoscopic optical apparatus according to claim 27 wherein said projection lens comprises a rotating mirrored surface for reflecting said modulated source beam toward said image-forming surface.

35. An autostereoscopic optical apparatus according to claim 27 further comprising a beamsplitter for directing said modulated source beam toward said reflective image-forming surface.

36. An autostereoscopic optical apparatus for displaying a color stereoscopic image comprising a left image and a right image, the apparatus comprising a left image generation system and a right image generation system wherein both left and right image generation systems are similarly constructed of separate components, with each image generation system comprising:
 (a) at least four light sources, each light source having a different color;

(b) at least one image modulator for modulating, at any one time, light from at least one of said at least four light sources to form a modulated source beam;

(c) a color combiner for directing said modulated source beam onto an optical axis; and (d) a lens for directing said modulated source beam on said optical axis toward an image-forming surface.

37. An autostereoscopic optical apparatus according to claim 36 wherein said light sources are from the group consisting of laser, LED, and lamp.

38. An autostereoscopic optical apparatus according to claim 36 wherein said colors are selected from the group consisting of red, green, blue, blue-green, yellow-green, and yellow.

39. An autostereoscopic optical apparatus according to claim 36 wherein said image modulator is selected from the group consisting of reflective LCD spatial light modulator, transmissive LCD spatial light modulator, digital micromirror device, resonant optical fiber, electromechanical grating device, conformal grating device, and grating light valve.

40. An autostereoscopic optical apparatus according to claim 36 wherein said color combiner is selected from the group consisting of X-cube, Philips prism, optical fiber, and dichroic combiner.

41. An autostereoscopic optical apparatus according to claim 36 wherein said image-forming surface provides an intermediate image.

42. An autostereoscopic optical apparatus according to claim 41 wherein said image-forming surface is selected from the group consisting of a ground glass, an etched glass, a ground polymer, an etched polymer, a coating, and an optical fiber faceplate.

43. An autostereoscopic optical apparatus according to claim 41 further comprising a projection lens for projecting said intermediate image toward a reflective surface for forming a virtual image.

44. An autostereoscopic optical apparatus according to claim 43 wherein said reflective surface is selected from the group consisting of a mirror, a curved mirror, and a Fresnel mirror.

45. An autostereoscopic optical apparatus according to claim 43 wherein said projection lens comprises a ball lens segment.

46. An autostereoscopic optical apparatus according to claim 43 wherein said projection lens further comprises a rotating mirrored surface.

47. An autostereoscopic optical apparatus according to claim 43 further comprising a beamsplitter for directing the projected intermediate image toward said reflective surface.

48. An autostereoscopic optical apparatus according to claim 41 further comprising a projection lens for projecting said intermediate image toward a display surface to form a real image for viewing.

49. An autostereoscopic optical apparatus according to claim 48 wherein said display surface comprises a retroreflective surface.

50. An autostereoscopic optical apparatus for displaying a multicolor stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left two-dimensional intermediate image and a right image generation system for forming a right two-dimensional intermediate image, wherein both left and right image generation systems are similarly constructed of separate components, with each image generation system comprising:

(a1) a first light source of a first color for providing a first incident beam, a second light source of a second color for providing a second incident beam, a third light source of a third color for providing a third incident beam, and a fourth light source of a fourth color for providing a fourth incident beam;

(a2) a multicolor linear array modulator for forming, on a diffusive surface, a multicolor line of source pixels by modulating said first, second, third, and fourth incident beams to provide a corresponding first, second, third, and fourth modulated beam; by combining said first, second, third, and fourth modulated beams onto a common axis to form a multicolor modulated beam; and by directing said multicolor modulated beam toward said diffusive surface;

(a3) a scanning ball lens assembly for projecting said multicolor line of source pixels to form an intermediate line image, said scanning ball lens assembly comprising:

(a3a) at least one reflective surface for reflecting light from said multicolor line of source image pixels to said intermediate line image;

(a3b) a ball lens segment having a scanning ball lens pupil, said ball lens segment having a center of curvature on said at least one reflective surface;

said scanning ball lens assembly rotating about an axis and forming a series of adjacent said intermediate line images in order to sequentially form said two-dimensional intermediate image thereby;

(b) a curved mirror having a center of curvature placed substantially optically midway between said scanning ball lens assembly for said left image generation system and said scanning ball lens assembly for said right image generation system;

(c) a beamsplitter disposed to fold the optical path from said left image generation system to form said left two-dimensional intermediate image near a front focal surface of said curved mirror and to fold the optical path from said right image generation system to form said right two-dimensional intermediate image near said front focal surface of said curved mirror; and said curved mirror forming said virtual stereoscopic image of said left and right two-dimensional intermediate images and, through said beamsplitter, forming a real image of said left scanning ball lens pupil at said left viewing pupil and a real image of said right scanning ball lens pupil at said right viewing pupil.

51. An autostereoscopic optical apparatus according to claim 50 wherein said first, second, third, and fourth light sources are from the group consisting of lasers, LEDs, and lamps.

52. An autostereoscopic optical apparatus according to claim 50 wherein said first, second, third, and fourth colors are selected from the group consisting of red, green, blue, blue-green, yellow-green, and yellow.

53. An autostereoscopic optical apparatus according to claim 50 wherein said multicolor linear array modulator comprises at least one image modulator from the group consisting of reflective LCD spatial light modulator, transmissive LCD spatial light modulator, digital micromirror device, resonant optical fiber, electromechanical grating device, conformal grating device, and grating light valve.

54. An autostereoscopic optical apparatus according to claim 53 further comprising a dichroic combiner for directing at least two of said first, second, third, and fourth incident beams to a single one of said at least one image modulator.

55. An autostereoscopic optical apparatus according to claim 50 further comprising a color combiner for combining said first, second, third, and fourth modulated beams onto said common axis, said color combiner selected from the group consisting of X-cube, Philips prism, optical fiber, and dichroic combiner.

56. An autostereoscopic optical apparatus according to claim 50 wherein said diffusive surface is selected from the group consisting of a ground glass, an etched glass, a ground polymer, an etched polymer, a coating, and an optical fiber faceplate.

57. An autostereoscopic optical apparatus according to claim 50 wherein said curved mirror is selected from the group consisting of a substantially spherical mirror, a membrane mirror, a replicated mirror, a Fresnel mirror, a cylindrical mirror, and a toroidal mirror.

58. An autostereoscopic optical apparatus according to claim 50 further comprising a logic controller for controlling at least two of said first, second, third, and fourth light sources.

59. An autostereoscopic optical apparatus according to claim 50 wherein said multicolor linear array modulator combines said first, second, third, and fourth modulated beams using an X-cube.

60. An autostereoscopic optical apparatus according to claim 50 wherein said multicolor linear array modulator combines said first, second, third, and fourth modulated beams using a dichroic surface.

61. An autostereoscopic optical apparatus according to claim 50 wherein said multicolor linear array modulator combines said first, second, third, and fourth modulated beams using an optical fiber.

62. An autostereoscopic optical apparatus according to claim 50 wherein said multicolor line of source pixels is a curved line.

63. An autostereoscopic optical apparatus according to claim 62 wherein said curved line shares said center of curvature with said ball lens segment.

64. An autostereoscopic optical apparatus according to claim 50 wherein said ball lens segment is a hemisphere.

65. An autostereoscopic optical apparatus according to claim 50 further comprising a motor for rotating said scanning ball lens assembly.

66. An autostereoscopic optical apparatus according to claim 65 wherein said motor rotates said scanning ball lens assembly for said left image generation system and said scanning ball lens assembly for said right image generation system in the same direction.

67. An autostereoscopic optical apparatus according to claim 65 wherein said motor rotates said scanning ball lens assembly for said left image generation system and said scanning ball lens assembly for said right image generation system in opposite directions.

68. An autostereoscopic optical apparatus according to claim 50 wherein said scanning ball lens assembly further comprises at least one meniscus lens.

69. An autostereoscopic optical apparatus according to claim 68 wherein a surface of said meniscus lens shares said center of curvature with said ball lens segment.

70. An autostereoscopic optical apparatus according to claim 50 wherein said scanning ball lens assembly comprises a refractive liquid.

71. An autostereoscopic optical apparatus according to claim 50 wherein said at least one reflective surface provides a beam splitting function.

72. An autostereoscopic optical apparatus according to claim 50 wherein said at least one reflective surface is planar.

73. An autostereoscopic optical apparatus according to claim 50 wherein said at least one reflective surface comprises a metallic coating.

74. An autostereoscopic optical apparatus according to claim 50 wherein said scanning ball lens assembly rotates less than about 180 degrees about said axis, said scanning ball lens assembly scanning in a reciprocating motion thereby.

75. An autostereoscopic optical apparatus according to claim 50 wherein the interaxial distance between said scanning ball lens assembly for said left image generation system and said scanning ball lens assembly for said right image generation system can be manually adjusted.

76. An autostereoscopic optical apparatus according to claim 50 wherein the interaxial distance between said scanning ball lens assembly for said left image generation system and said scanning ball lens assembly for said right image generation system can be automatically adjusted.

77. An autostereoscopic optical apparatus for displaying a multicolor stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left two-dimensional intermediate image and a right image generation system for forming a right two-dimensional intermediate image, wherein both left and right image generation systems are similarly constructed of separate components, with each image generation system comprising:

(a1) a first light source of a first color for providing a first incident beam, a second light source of a second color for providing a second incident beam, a third light source of a third color for providing a third incident beam, and a fourth light source of a fourth color for providing a fourth incident beam;

(a2) a multicolor linear scanner for forming, on a diffusive surface, a multicolor line of source pixels by combining said first, second, third, and fourth incident beams onto a common axis, by modulating each said incident beam on said common axis to form a multicolor modulated beam; and by directing said multicolor modulated beam toward said diffusive surface;

(a3) a scanning ball lens assembly for projecting said multicolor line of source pixels to form an intermediate line image, said scanning ball lens assembly comprising:

(a3a) at least one reflective surface for reflecting light from said multicolor line of source image pixels to said intermediate line image;

(a3b) a ball lens segment having a scanning ball lens pupil, said ball lens segment having a center of curvature on said at least one reflective surface;

said scanning ball lens assembly rotating about an axis and forming a series of adjacent said intermediate line images in order to sequentially form said two-dimensional intermediate image thereby;

(b) a curved mirror having a center of curvature placed substantially optically midway between said scanning ball lens assembly for said left image generation system and said scanning ball lens assembly for said right image generation system;

(c) a beamsplitter disposed to fold the optical path from said left image generation system to form said left two-dimensional intermediate image near a front focal surface of said curved mirror and to fold the optical path from said right image generation system to form said right two-dimensional intermediate image near said front focal surface of said curved mirror; and said curved mirror forming said virtual stereoscopic image of said left and right two-dimensional intermediate images and, through said beamsplitter, forming a real image of said left scanning ball lens pupil at said left viewing pupil and a real image of said right scanning ball lens pupil at said right viewing pupil.

78. An autostereoscopic optical apparatus according to claim 77 wherein said first, second, third, and fourth light sources are from the group consisting of lasers and LEDs.

79. An autostereoscopic optical apparatus according to claim 77 wherein said first, second, third, and fourth colors are selected from the group consisting of red, green, blue, blue-green, yellow-green, and yellow.

80. An autostereoscopic optical apparatus according to claim 77 wherein said multicolor linear scanner comprises a resonant optical fiber.

81. An autostereoscopic optical apparatus according to claim 77 wherein said multicolor linear scanner combines said first, second, third, and fourth incident beams using a multi-furcated optical fiber.

82. An autostereoscopic optical apparatus according to claim 77 wherein said diffusive surface is selected from the group consisting of a ground glass, an etched glass, a ground polymer, an etched polymer, a coating, and an optical fiber faceplate.

83. An autostereoscopic optical apparatus according to claim 77 wherein said curved mirror is selected from the group consisting of a substantially spherical mirror, a membrane mirror, a replicated mirror, a Fresnel mirror, a cylindrical mirror, and a toroidal mirror.

84. An autostereoscopic optical apparatus according to claim 77 further comprising a logic controller for controlling the timing of said first, second, third, and fourth light sources.

85. An autostereoscopic optical apparatus according to claim 77 wherein said at least one reflective surface is planar.

86. An autostereoscopic optical apparatus according to claim 77 wherein said at least one reflective surface provides a beam splitting function.

87. An autostereoscopic optical apparatus according to claim 77 wherein said scanning ball lens assembly rotates less than about 180 degrees about said axis, said scanning ball lens assembly scanning in a reciprocating motion thereby.

88. An autostereoscopic optical apparatus for displaying a color stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left two-dimensional intermediate image and a right image generation system for forming a right two-dimensional intermediate image, wherein both left and right image generation systems are similarly constructed of separate components, with each image generation system comprising:

(a1) a first electromechanical grating device for modulating an incident light beam from a first color light source to form a first color line of source pixels;

(a2) a second electromechanical grating device for modulating an incident light beam from a second color light source to form a second color line of source pixels;

(a3) a third electromechanical grating device for modulating an incident light beam from a third color light source to form a third color line of source pixels;

(a4) a fourth electromechanical grating device for modulating an incident light beam from a fourth color light source to form a fourth color line of source pixels;

(a5) a color combiner for combining said first, second, third, and fourth color lines of source pixels to form, on a diffusive surface, a multicolor line of source pixels;

(a6) a scanning ball lens assembly for projecting said multicolor line of source pixels to form an intermediate line image, said scanning ball lens assembly comprising:

(a6a) at least one reflective surface for reflecting light from said line of source image pixels to said intermediate line image;

(a6b) a ball lens segment having a scanning ball lens pupil, said ball lens segment having a center of curvature on said at least one reflective surface;

said scanning ball lens assembly rotating about an axis and forming a series of adjacent said intermediate line images in order to sequentially form said two-dimensional intermediate image thereby;

(b) a curved mirror having a center of curvature placed substantially optically midway between said scanning ball lens assembly for said left image generation system and said scanning ball lens assembly for said right image generation system;

(c) a beamsplitter disposed to fold the optical path from said left image generation system to form said left two-dimensional intermediate image near a front focal surface of said curved mirror and to fold the optical path from said right image generation system to form said right two-dimensional intermediate image near said front focal surface of said curved mirror; and said curved mirror forming said virtual stereoscopic image of said left and right two-dimensional intermediate images and, through said beamsplitter, forming a real image of said left scanning ball lens pupil at said left viewing pupil and a real image of said right scanning ball lens pupil at said right viewing pupil.

89. An autostereoscopic optical apparatus according to claim 88 wherein said first, second, third, and fourth electromechanical grating device modulate using pulse-width modulation.

90. An autostereoscopic optical apparatus for displaying a color stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) a left image generation system for forming a left two-dimensional intermediate image and a right image generation system for forming a right two-dimensional intermediate image, wherein both left and right image generation systems are similarly constructed of separate components, with each image generation system comprising:

(a1) a first color light source, a second color light source, a third color light source, and a fourth color light source;

(a2) a first electromechanical grating device for modulating the incident light beam from said first color light source to form a first color line of source pixels;

(a3) a second electromechanical grating device for modulating the incident light beam from said second color light source to form a second color line of source pixels;

(a4) first combining means for directing said third color light source and said fourth color light source to a third electromechanical grating device to form a selectable third color line of source pixels;

(a5) second combining means for combining said first, said second, and said selectable third color lines of source pixels to form, on a diffusive surface, a multicolor line of source pixels;

(a6) a scanning ball lens assembly for projecting said multicolor line of source pixels to form an intermediate line image, said scanning ball lens assembly comprising:

(a6a) at least one reflective surface for reflecting light from said line of source image pixels to said intermediate line image;

(a6b) a ball lens segment having a scanning ball lens pupil, said ball lens segment having a center of curvature on said at least one reflective surface;

said scanning ball lens assembly rotating about an axis and forming a series of adjacent said intermediate line images in order to sequentially form said two-dimensional intermediate image thereby.

(b) a curved mirror having a center of curvature placed substantially optically midway between said scanning ball lens assembly for said left image generation system and said scanning ball lens assembly for said right image generation system;

(c) a beamsplitter disposed to fold the optical path from said left image generation system to form said left two-dimensional intermediate image near a front focal surface of said curved mirror and to fold the optical path from said right image generation system to form said right two-dimensional intermediate image near said front focal surface of said curved mirror; and said curved mirror forming said virtual stereoscopic image of said left and right two-dimensional intermediate images and, through said beamsplitter, forming a real image of said left scanning ball lens pupil at said left viewing pupil and a real image of said right scanning ball lens pupil at said right viewing pupil.

91. An autostereoscopic optical apparatus according to claim 90 wherein said first electromechanical grating device is a conformal grating device.

92. An autostereoscopic optical apparatus according to claim 90 wherein said first electromechanical grating device is a grating light valve.

93. An autostereoscopic optical apparatus according to claim 90 wherein said first electromechanical grating device is disposed at a diagonal relative to the incident light beam from said first color light source.

94. An autostereoscopic optical apparatus according to claim 90 wherein said first light source comprises:

(a) a first laser having a first wavelength;

(b) a second laser having a second wavelength;

(c) a dichroic mirror for reflecting light from said first laser and transmitting light from said second laser.

95. An autostereoscopic optical apparatus for displaying a multicolor stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) an image generation system for forming a left two-dimensional intermediate image and a right two-dimensional intermediate image, said image generation system comprising:

(a1) a first light source of a first color for providing a first incident beam, a second light source of a second color for providing a second incident beam, a third light source of a third color for providing a third incident beam, and a fourth light source of a fourth color for providing a fourth incident beam;

(a2) means for modulating said first incident beam to provide a first modulated beam, modulating said second incident beam to provide a second modulated beam, modulating said third incident beam to provide a third modulated beam, and modulating said fourth incident beam to provide a fourth modulated beam;

(a3) means for combining said first, second, third, and fourth modulated beams onto a common axis to provide a multicolor modulated beam;

(a4) an optical switch for alternately switching said multicolor modulated beam into a left image beam and a right image beam, said left image beam directed to a left diffusive surface for forming a left line of source pixels and said right image beam directed to a right diffusive surface for forming a right line of source pixels;

(a5) a left scanning ball lens assembly for projecting said left line of source pixels to form a left intermediate line image and a right scanning ball lens assembly for projecting said right line of source pixels to form a right intermediate line image, each scanning ball lens assembly comprising:

(a5a) at least one reflective surface for reflecting light from said left or right line of source pixels to said left or right intermediate line image, respectively;

(a5b) a ball lens segment having a scanning ball lens pupil, said ball lens segment having a center of curvature on said at least one reflective surface;

each said left and right scanning ball lens assembly rotating about its axis and forming a series of adjacent said intermediate line images in order to sequentially form said left and right two-dimensional intermediate images thereby;

(b) a curved minor having a center of curvature placed substantially optically midway between said left scanning ball lens assembly and said right scanning ball lens assembly;

(c) a beamsplitter disposed to form said left two-dimensional intermediate image near a front focal surface of said curved mirror and to form said right two-dimensional intermediate image near said front focal surface of said curved mirror; and said curved mirror forming said stereoscopic virtual image of said left and right two-dimensional intermediate images and, through said beamsplitter, forming a real image of said left scanning ball lens pupil at said left viewing pupil and a real image of said right scanning ball lens pupil at said right viewing pupil.

96. An autostereoscopic optical apparatus according to claim 95 wherein said optical switch comprises a liquid crystal shutter.

97. An autostereoscopic optical apparatus according to claim 95 wherein said liquid crystal shutter cooperates with a polarizing beamsplitter for directing light.

98. An autostereoscopic optical apparatus according to claim 95 wherein said optical switch comprises a rotating waveplate.

99. An autostereoscopic optical apparatus according to claim 95 wherein said optical switch comprises a patterned mirror having reflective and transmissive portions, said mirror reciprocating between a first position for directing light to said left diffusive surface and a second position for directing light to said right diffusive surface.

100. An autostereoscopic optical apparatus according to claim 99 wherein said reflective and transmissive portions of said patterned mirror are dimensioned according to the spacing of diffracted orders of light modulated by said electromechanical grating device.

101. An autostereoscopic optical apparatus according to claim 95 wherein said image generation system forms said left two-dimensional intermediate image and said right two-dimensional intermediate image in a repeated sequence.

102. An autostereoscopic optical apparatus for viewing a stereoscopic virtual image comprising an array of image pixels, said stereoscopic virtual image comprising a left image to be viewed by an observer at a left viewing pupil and a right image to be viewed by the observer at a right viewing pupil, the apparatus comprising:
 (a) an image generation system for forming, in a repeated sequence, a left two-dimensional intermediate image and a right two-dimensional intermediate image, said image generation system comprising:
   (a1) a first light source of a first color for providing a first incident beam, a second light source of a second color for providing a second incident beam, a third light source of a third color for providing a third incident beam, and a fourth light source of a fourth color for providing a fourth incident beam;
   (a2) means for modulating said first incident beam to provide a first modulated beam, modulating said second incident beam to provide a second modulated beam, modulating said third incident beam to provide a third modulated beam, and modulating said fourth incident beam to provide a fourth modulated beam;
   (a3) means for combining said first, second, third, and fourth modulated beams onto a common axis to provide a multicolor modulated beam;
   (a4) a first beamsplitter for splitting said multicolor modulated light beam into a left image beam and a right image beam, said left image beam directed to a left diffusive surface for forming a left line of source pixels and said right image beam directed to a right diffusive surface for forming a right line of source pixels;
   (a5) a left scanning ball lens assembly for projecting said left line of source pixels to form a left intermediate line image and a right scanning ball lens assembly for projecting said right line of source pixels to form a right intermediate line image, each scanning ball lens assembly comprising:
     (a5a) at least one reflective surface for reflecting light from said left or right line of source pixels to said left or right intermediate line image, respectively;
     (a5b) a ball lens segment having a scanning ball lens pupil, said ball lens segment having a center of curvature on said at least one reflective surface;
   each said left and right scanning ball lens assembly rotating about its axis and forming a series of adjacent said intermediate line images in order to sequentially form said left and right two-dimensional intermediate image thereby;
 (b) a curved mirror having a center of curvature placed substantially optically midway between said left scanning ball lens assembly and said right scanning ball lens assembly;
 (c) a second beamsplitter disposed to form said left two-dimensional intermediate image near a front focal surface of said curved mirror and to form said right two-dimensional intermediate image near said front focal surface of said curved mirror; and
 said curved mirror forming said stereoscopic virtual image of said left and right two-dimensional intermediate images and, through said second beamsplitter, forming a real image of said left scanning ball lens pupil at said left viewing pupil and a real image of said right scanning ball lens pupil at said right viewing pupil.

103. A method for display of a stereoscopic virtual image to an observer, the image comprising a left image to be viewed by the observer at a left viewing pupil and a right image to be viewed by the observer at a right viewing pupil, the method comprising:
 (a) forming a left intermediate image as a two-dimensional image, comprising a plurality of sequential left intermediate line images, near the focal surface of a curved mirror, each left intermediate line image formed by:
   (a1) rotating a left scanning ball lens assembly to a left predetermined position;
   (a2) modulating a first left light source to provide a first left modulated light beam;
   (a3) modulating a second left light source to provide a second left modulated light beam;
   (a4) modulating a third left light source to provide a third left modulated light beam;
   (a5) modulating a fourth left light source to provide a fourth left modulated light beam;
   (a6) combining said first, second, third, and fourth left modulated light beams onto a left common axis to form a left multicolor modulated light beam;
   (a7) directing said left multicolor modulated light beam onto a left curved diffusive surface to form a line of source pixels of said left intermediate image;
   (a8) projecting said line of source pixels of said left intermediate image using said left scanning ball lens assembly to form said left intermediate line image near said focal surface of said curved mirror;
 (b) forming a right intermediate image as a two-dimensional image, comprising a plurality of sequential right intermediate line images, near the focal surface of a curved mirror, each right intermediate line image formed by:
   (b1) rotating a right scanning ball lens assembly to a right predetermined position;
   (b2) modulating a first right light source to provide a first right modulated light beam;
   (b3) modulating a second right light source to provide a second right modulated light beam;
   (b4) modulating a third right light source to provide a third right modulated light beam;
   (b5) modulating a fourth right light source to provide a fourth right modulated light beam;
   (b6) combining said first, second, third, and fourth right modulated light beams onto a right common axis to form a right multicolor modulated light beam;
   (b7) directing said right multicolor modulated light beam onto a right curved diffusive surface to form a line of source pixels of said right intermediate image;
   (b8) projecting said line of source pixels of said right intermediate image using said right scanning ball lens assembly to form said right intermediate line image near said focal surface of said curved mirror;

(c) forming a left virtual image from said left intermediate image, said left virtual image viewable from said left viewing pupil, said left viewing pupil formed by said curved mirror as an image of said left scanning ball lens pupil; and (d) forming a right virtual image from said right intermediate image, said right virtual image viewable from said right viewing pupil, said right viewing pupil formed by said curved mirror as an image of said right scanning ball lens pupil.

104. The method for display of a stereoscopic virtual image to an observer according to claim 103 wherein the step of forming said left intermediate line image comprises the step of projecting each said line of source pixels of said left intermediate image through a beamsplitter.

105. The method for display of a stereoscopic virtual image to an observer according to claim 103 further comprising the step of adjusting the displacement between said left intermediate image and said right intermediate image to adapt to operator interocular distance.

106. The method for display of a stereoscopic virtual image to an observer according to claim 103 wherein the step of projecting said line of source pixels of said right intermediate image alternates with the step of projecting said line of source pixels of said left intermediate image, thereby forming said left and right intermediate line images in sequence.

107. The method for display of a stereoscopic virtual image to an observer according to claim 103 wherein the step of modulating said first left light source comprises the step of modulating an electromechanical grating device.

108. The method display of a stereoscopic virtual image to an observer according to claim 103 wherein the step of modulating said first left light source comprises the step of modulating a resonant optical fiber.

109. A method for display of a stereoscopic virtual image to an observer, the image comprising a left image to be viewed by the observer at a left viewing pupil and a right image to be viewed by the observer at a right viewing pupil, the method comprising:

(a) forming a multicolor modulated light beam by:
  (a1) modulating a first light source to provide a first modulated light beam;
  (a2) modulating a second light source to provide a second modulated light beam;
  (a3) modulating a third light source to provide a third modulated light beam;
  (a4) modulating a fourth light source to provide a fourth modulated light beam;
  (a5) combining said first, second, third, and fourth modulated light beams onto a common axis to form a multicolor modulated light beam;

(b) alternately forming a left intermediate image and a right intermediate image with the repeated sequence of:
  (b1) switching said multicolor modulated light beam toward a left diffusive surface to form a left intermediate image; then,
  (b2) switching said multicolor modulated light beam toward a right diffusive surface to form a right intermediate image;

(c) projecting said left intermediate image toward the focal surface of a curved mirror through a left ball lens assembly, said left ball lens assembly having a left ball lens pupil, and projecting said right intermediate image toward the focal surface of said curved mirror through a right ball lens assembly, said right ball lens assembly having a right ball lens pupil;

(d) forming a left virtual image from said left intermediate image, said left virtual image viewable from said left viewing pupil, said left viewing pupil formed by said curved mirror as an image of said left ball lens pupil; and (e) forming a right virtual image from said right intermediate image, said right virtual image viewable from said right viewing pupil, said right viewing pupil formed by said curved mirror as an image of said right ball lens pupil.

110. A method for display of a stereoscopic virtual image according to claim 109 wherein the step of switching said multicolor modulated light beam comprises the step of using a liquid crystal shutter.

111. A method for display of a stereoscopic virtual image according to claim 109 wherein the step of switching said multicolor modulated light beam comprises the step of using a reciprocating mirror.

112. A method for display of a stereoscopic virtual image according to claim 111 wherein said reciprocating mirror comprises a plurality of transmissive and reflective portions.

113. A method for display of a stereoscopic virtual image to an observer, the image comprising a left image to be viewed by the observer at a left viewing pupil and a right image to be viewed by the observer at a right viewing pupil, the method comprising:

(a) forming a multicolor modulated light beam with the steps of:
  (a1) modulating a first light source to provide a first modulated light beam;
  (a2) modulating a second light source to provide a second modulated light beam;
  (a3) modulating a third light source to provide a third modulated light beam;
  (a4) modulating a fourth light source to provide a fourth modulated light beam;
  (a5) combining said first, second, third, and fourth modulated light beams onto a common axis to form a multicolor modulated light beam;

(b) splitting said multicolor modulated light beam into:
  (b1) a left multicolor modulated light beam directed toward a left diffusive surface to form a left intermediate image; and
  (b2) a right multicolor modulated light beam directed toward a right diffusive surface to form a right intermediate image; and (c) projecting said left intermediate image toward the focal surface of a curved mirror through a left ball lens assembly, said left ball lens assembly having a left ball lens pupil, and projecting said right intermediate image toward the focal surface of said curved mirror through a right ball lens assembly, said right ball lens assembly having a right ball lens pupil;

(d) forming a left virtual image from said left intermediate image, said left virtual image viewable from said left viewing pupil, said left viewing pupil formed by said curved mirror as an image of said left ball lens pupil; and (e) forming a right virtual image from said right intermediate image, said right virtual image viewable from said right viewing pupil, said right viewing pupil formed by said curved mirror as an image of said right ball lens pupil.

* * * * *

UNITED STATES PATENT AND TRADEMARK OFFICE
CERTIFICATE OF CORRECTION

PATENT NO. : 6,779,892 B2  
APPLICATION NO. : 10/205723  
DATED : August 24, 2004  
INVENTOR(S) : John A. Agostinelli et al.

It is certified that error appears in the above-identified patent and that said Letters Patent is hereby corrected as shown below:

Col. 38, line 44, Claim 95 (b), delete "a curved minor"; insert --a curved mirror --

Signed and Sealed this

First Day of May, 2007

JON W. DUDAS  
*Director of the United States Patent and Trademark Office*